United States Patent
Mizuno et al.

(10) Patent No.: US 8,361,399 B2
(45) Date of Patent: Jan. 29, 2013

(54) HONEYCOMB FILTER

(75) Inventors: Yukio Mizuno, Komaki (JP); Yukio Miyairi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 804 days.

(21) Appl. No.: 12/127,243

(22) Filed: May 27, 2008

(65) Prior Publication Data

US 2008/0295469 A1    Dec. 4, 2008

(30) Foreign Application Priority Data

May 31, 2007  (JP) .................................. 2007-145239

(51) Int. Cl.
  *B01D 46/00*   (2006.01)
(52) U.S. Cl. ......................................... 422/177; 55/523
(58) Field of Classification Search .................... 55/479, 55/282.2, 385.3, DIG. 5, DIG. 10, DIG. 30, 55/522–524; 264/628, 630, 631, DIG. 48; 60/295, 297, 311; 422/211, 205, 168–172, 422/177–182; 428/116–117
See application file for complete search history.

(56) References Cited

U.S. PATENT DOCUMENTS

| | | | |
|---|---|---|---|
| 4,101,287 A * | 7/1978 | Sweed et al. ................... | 422/200 |
| 2003/0024219 A1 | 2/2003 | Harada et al. | |
| 2003/0143370 A1 | 7/2003 | Noguchi et al. | |
| 2003/0167755 A1 * | 9/2003 | Nakatani et al. ................. | 60/288 |
| 2005/0066640 A1 * | 3/2005 | Towsley ........................... | 55/525 |
| 2005/0191461 A1 * | 9/2005 | Kasai et al. ..................... | 428/116 |
| 2006/0075731 A1 * | 4/2006 | Ohno et al. ...................... | 55/523 |
| 2007/0231539 A1 * | 10/2007 | Miyairi et al. ................. | 428/116 |
| 2010/0234206 A1 * | 9/2010 | Miao et al. ...................... | 501/83 |

FOREIGN PATENT DOCUMENTS

| | | |
|---|---|---|
| EP | 1 837 063 A1 | 9/2007 |
| JP | A-2001-269585 | 10/2001 |
| JP | A-2006-077672 | 3/2006 |
| WO | WO 2007/079377 A2 | 7/2007 |

OTHER PUBLICATIONS

Apr. 13, 2011 European Search Report issued in EP 08 25 1809.3.
Nov. 20, 2012 Office Action issued in Japanese Application No. 2007-145239 (with translation).

* cited by examiner

*Primary Examiner* — Duane Smith
*Assistant Examiner* — Karla Hawkins
(74) *Attorney, Agent, or Firm* — Oliff & Berridge, PLC

(57) ABSTRACT

A honeycomb filter 1 of the present invention includes a honeycomb structure 2 having partition walls 7 and plugging portions, and the partition walls 7 are constituted of a porous layer in which a first wall portion 7a having an average pore diameter of 20 μm or more and carrying an oxidation catalyst 11 on the inner surfaces of formed pores 8, a second wall portion 7b functioning as a buffer and having a high porosity, and a third wall portion 7c having an average pore diameter of 1 to 15 μm and a porosity of 50 to 90% are laminated in the thickness direction of the partition walls 7 from a surface side where cells 9a having opening end portions opened on an inflow side and opening end portions plugged on an outflow side are defined.

9 Claims, 8 Drawing Sheets

EXHAUST GAS

HONEYCOMB FILTER

TECHNICAL FIELD

The present invention relates to a honeycomb filter. More particularly, it relates to a honeycomb filter capable of realizing a high trapping efficiency and continuously regenerating the filter during the use of the filter, so that a pressure loss can be reduced.

BACKGROUND ART

As a dust collecting filter typified by a diesel particulate filter (hereinafter sometimes referred to as the "DPF"), a filter having a honeycomb structure and made of a ceramic (a honeycomb filter) is used.

Usually as the filter for use in such an object, as shown in FIGS. 14 and 15, there is broadly used a wall flow type honeycomb filter 51 having a honeycomb structure 52 in which a plurality of cells 59 communicating between two end faces and constituting fluid passages are partitioned by porous partition walls 57, and plugging portions 58 arranged in checkered patterns complementarily formed by one end face and the other end face of the honeycomb structure 52 so that one of two opening end portions of each cell 59 is plugged (for example, see Patent Document 1).

When an exhaust gas containing particulate matter (hereinafter sometimes referred to as the "PM") is supplied from one end face 53 of this honeycomb filter 51, this exhaust gas flows into the honeycomb filter from the one end face 53 thereof, and the PM contained in the exhaust gas is removed. Afterward, the gas flows out of the other end face 55. Specifically, first the exhaust gas flows into cells 59b having end portions which are not plugged in the one end face 53 and having end portions plugged in the other end face 55. The gas passes through the porous partition walls 57, roves to cells 59a having end portions plugged in the one end face 53 and having end portions which are not plugged in the other end face 55, and is discharged from these cells 59a. Then, in this case, the partition walls 57 function as a filter layer, and the PM in the gas is trapped by the partition walls 57 and accumulated on the partition walls 57.

In such a honeycomb filter, the PM is accumulated on the partition walls of the honeycomb structure constituting the filter, whereby a pressure loss rises. Therefore, in such a honeycomb filter, when a predetermined amount of the PM is accumulated on the partition walls, the honeycomb filter is forcibly heated to a high temperature, and the PM accumulated on the partition walls is oxidized and removed.

[Patent Document 1] JP-A-2001-269585

However, during the oxidation and removal of the PM, a fuel is excessively jetted to burn the PM, so that there is a problem that a fuel consumption ratio becomes unfavorable and an economical property deteriorates. Moreover, the temperature of the honeycomb filter becomes high, so that there is another problem that the honeycomb filter is damaged.

Moreover, to reduce the PM accumulation, it is suggested that an oxidation catalyst for oxidizing the PM be carried on the porous partition walls. However, in a case where the amount of PM is large, there are problems that the PM is accumulated in layers on the partition walls and that a frequency at which the oxidation catalyst cones in contact with the PM decreases, so that a sufficient effect cannot be obtained.

Furthermore, in a honeycomb filter, it is also suggested that surfaces of fluid inflow side of the partition walls, through which a fluid passes, be constituted of a porous body having large pore diameters, and surfaces of a side opposite to the fluid inflow side of the partition walls (surfaces of a fluid outflow side of the partition walls) be constituted of a porous body having small pore diameters. However, such a honeycomb filter has a problem that the pressure loss rapidly rises when the PM is accumulated on the partition walls.

In addition, to simply reduce the rise of the pressure loss, for example, it is considered that the partition walls be formed only of the porous body having large pore diameters, but there are problems that such a honeycomb filter has a low trapping efficiency, and cannot be used as the above-mentioned DPF or the like.

DISCLOSURE OF THE INVENTION

The present invention has been developed in view of such a problem of the conventional technology, and an object thereof is to provide a honeycomb filter capable of realizing a high trapping efficiency and continuously regenerating the filter during the use of the filter, so that a pressure loss can be reduced.

The present inventors have found that at least a part of partition walls of a honeycomb structure constituting a honeycomb filter is constituted so that at least three layers of a first wall portion, a second wall portion, and a third wall portion indicating a predetermined value of at least one of an average pore diameter and a porosity are laminated in the thickness direction of the partition walls, whereby the above problem can be solved, and they have completed the present invention. Specifically, according to the present invention, the following honeycomb filter is provided.

[1] A honeycomb filter comprising: a honeycomb structure having porous partition walls, and a plurality of cells partitioned by the partition walls to constitute passages of a fluid; and plugging portions which plug opening end portions of predetermined cells of the plurality of cells on an outflow side where the fluid flows out and which plug opening end portions of remaining cells on an inflow side where the fluid flows in, wherein at least a part of the partition walls includes at least three wall portions of a first wall portion, a second wall portion, and a third wall portion which are laminated in a thickness direction of the partition walls from a surface side where the predetermined cells are defined, the first wall portion is arranged on the surface side of the partition walls where the predetermined cells having the opening end portions plugged on the outflow side are defined, has an average pore diameter of 20 μm or more, and carries an oxidation catalyst on the inner surfaces of formed pores, the second wall portion is arranged on the back surface of the first wall portion, and has a porosity which is higher than that of the first and third wall portions and which is a value of 60% or more, and the third wall portion is arranged on the back surface of the second wall portion, and has an average pore diameter of 1 to 15 μm and a porosity of 50 to 90%.

[2] The honeycomb structure according to the above [1], wherein the hydraulic diameter of the predetermined cells is equal to or larger than that of the remaining cells.

[3] The honeycomb filter according to the above [1] or [2], wherein the shape of the section of the cell vertical to an axial direction is one of a triangular shape, a quadrangular shape, and a combination of the quadrangular shape and an octagonal shape, and the plugging portions are arranged so that the predetermined cells having the opening end portions plugged on the outflow side and the remaining cells having the opening end portions plugged on the inflow side are alternately arranged.

[4] The honeycomb filter according to any one of the above [1] to [3], wherein the second wall portion has a porosity of 64% or more.

[5] The honeycomb filter according to any one of the above [1] to [4], wherein the first wall portion has an average pore diameter of 25 μm or more.

[6] The honeycomb filter according to any one of the above [1] to [5], wherein the volume ratio of the pores having a pore diameter of below 10 μm with respect to the pores of the first wall portion is below 10%.

[7] The honeycomb filter according to any one of the above [1] to [6], wherein the second wall portion is constituted of a void formed between the first wall portion and the third wall portion.

[8] The honeycomb filter according to any one of the above [1] to [6], wherein the second wall portion is constituted of a fibrous porous material.

[9] The honeycomb filter according to any one of the above [1] to [8], wherein at least a part of the partition wails further has a fourth wall portion arranged on the back surface of the third wail portion, and the fourth wall portion has an average pore diameter of 20 μm or mare, and carries an oxidation catalyst on the inner surfaces of formed pores.

The honeycomb filter of the present invention realizes a high trapping efficiency, and the filter can continuously be regenerated during the use of the filter, so that a pressure loss can be reduced.

That is, in the honeycomb filter of the present invention, as a porous body which traps a particulate matter (PM), the first wail portion provided with the pores having a comparatively large average pore diameter traps the most part of the PM in an exhaust gas. Then, the PM trapped by this first wall portion is oxidized and removed by the oxidation catalyst carried in the pores of the first wall portion.

In this case, the oxidation catalyst of the first wall portion oxidizes nitrogen monoxide (NO) contained in the exhaust gas to form nitrogen dioxide ($NO_2$). The oxidation of the PM is also prorated by nitrogen dioxide formed in this manner, and the regeneration of the filter (the oxidation and removal of the PM) is further effectively performed.

It is to be noted that in the honeycomb filter of the present invention, as described above, the pores of the first wall portion have a comparatively large average pore diameter, and a part of the PM, for example, the PM having snail particle diameters sometimes passes through the pores of the first wall portion. The PM which has passed through the first wall portion in this manner is trapped by the third wall portion arranged on a downstream side of the first wall portion, and the trapped PM is oxidized and removed by nitrogen dioxide formed by the first wall portion.

However, in a case where the first wall portion and the third wall portion are arranged adjacent to each other, the exhaust gas which has passed through the first wall portion is locally concentrated on the third wall portion corresponding to an outlet position of the pores of the first wall portion, and the pressure loss of the honeycomb filter increases.

The honeycomb filter of the present invention is constituted so that the exhaust gas which has passed through the first wall portion once flows into the second wall portion having a porosity higher than that of the first and third wall portions and having a porosity of 60% or more. Therefore, the second wall portion functions as a buffer, and the exhaust gas is allowed to pass through the second wall portion so as to apply a more uniform pressure to a broad region of the surface of the third wall portion. In consequence, it can be prevented that the exhaust gas locally flows into the third wall portion, and the pressure loss of the whole honeycomb filter can satisfactorily be suppressed. A part of the PM which has passed through the first wall portion is oxidized and removed by nitrogen dioxide even in this second wall portion, so that an amount of PM to be removed by the third wall portion can be reduced, and rise of the pressure loss can further be suppressed. Moreover, an amount of PM to be locally accumulated on a portion where flow is concentrated can be reduced, so that a passage thickness in which the exhaust gas passes through the PM accumulated portion can substantially be reduced. Moreover, a flow rate of the gas which passes through the layer of the PM is also reduced, so that the rise of the pressure loss can be suppressed.

DESCRIPTION OF REFERENCE NUMERALS

1: honeycomb filter, 2: honeycomb structure, 7: partition wall, 7a: first wall portion, 7b: second wall portion, 7c: third wall portion, 7d: fourth wall portion, 8: plugging portion, 9: cell, 9a: cell (predetermined cell), 9b: cell (remaining cell), 11, 12: oxidation catalyst, 51: honeycomb filter, 52: honeycomb structure, 53: one end face, 55: other end face, 57: partition wall, 58: plugging portion, 59, 59a, 59b: cell.

BEST MODE FOR CARRYING OUT THE INVENTION

The best mode for carrying out the present invention will hereinafter be described, but it should be understood that the present invention is not limited to the following embodiment and that appropriate change, improvement, or the like applied to the following embodiment based on ordinary knowledge of any person skilled in the art without departing from the present invention is included in the scope of the present invention.

Figure 1:
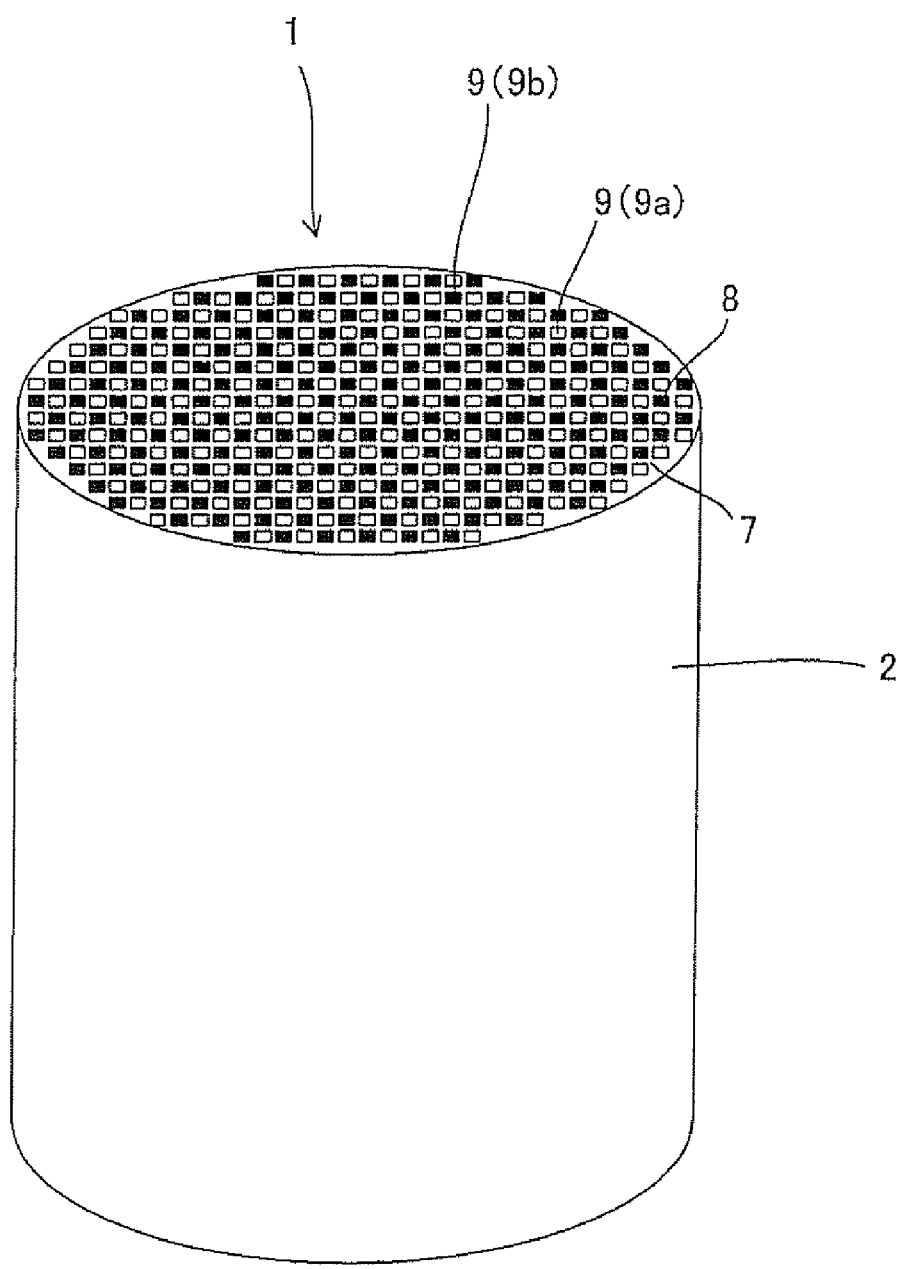
FIG. 1 is a perspective view schematically showing one embodiment of a honeycomb filter of the present invention.
Figure 2:
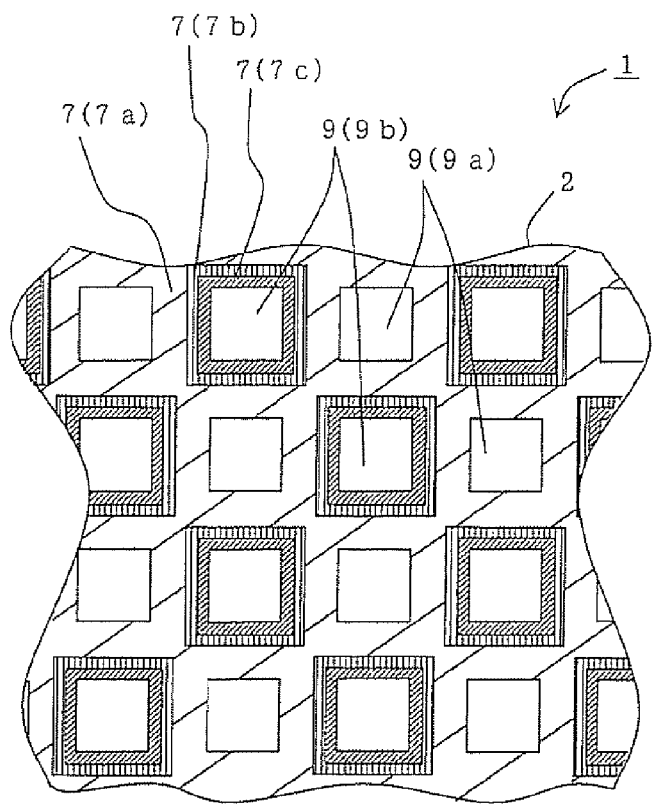
FIG. 2 is an enlarged sectional view showing a section of the honeycomb filter shown in FIG. 1 cut along a face vertical to a cell communicating direction.

[1] Honeycomb Filter:

FIG. 1 is a perspective view schematically showing one embodiment of a honeycomb filter of the present invention, and FIG. 2 is an enlarged sectional view showing a section of the honeycomb filter shown in FIG. 1 cut along a face vertical to a cell communicating direction. Moreover, FIG. 3 is an enlarge sectional view showing a section of a partition wall of the honeycomb filter shown in FIG. 1 cut along a face vertical to a cell defining surface.

As shown in FIG. 1, the honeycomb filter of the present invention includes a honeycomb structure 2 having porous partition walls 7 and a plurality of cells 9 partitioned by the partition walls 7 to constitute passages of a fluid; and plugging portions 8 which plug opening end portions of predetermined cells 9a of the plurality of cells 9 on a side (hereinafter sometimes referred to as the "outflow side") where the fluid flows out and which plug opening end portions of remaining cells 9b on a side (hereinafter sometimes referred to as the "inflow side") where the fluid flows in. As shown in FIG. 2, at least a part of the partition walls 7 is constituted of a porous layer in which at least three wall portions of a first wall portion 7a, a second wall portion 7b, and a third wall portion 7c are laminated in a thickness direction of the partition walls 7 from a surface side where the predetermined cells 9a are defined.

Figure 3:
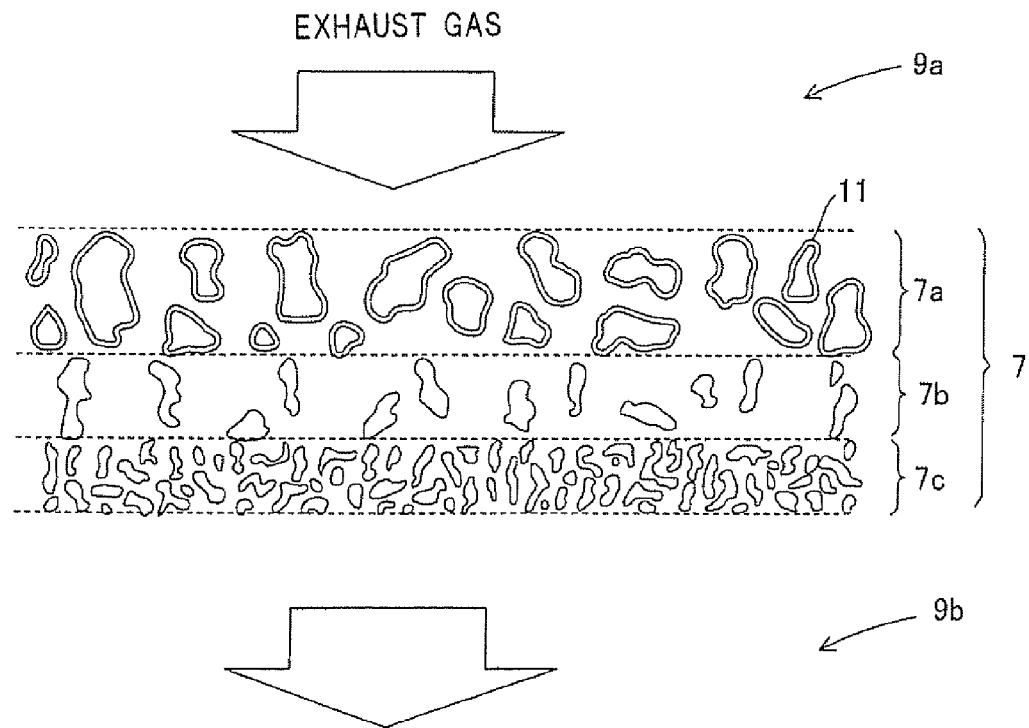
FIG. 3 is an enlarged sectional view showing a section of a partition wall of the honeycomb filter shown in FIG. 1 cut along a face vertical to a cell defining surface.

As shown in FIGS. 2 and 3, the first wall portion 7a is a porous body arranged on the surface side where the predetermined cells 9a having the opening end portions plugged on the outflow side and having the opening end portions opened on the inflow side are defined, and the first wall portion has an average pore diameter of 20 μm or more, and carries an oxidation catalyst 11 on inner surfaces of formed pores 8.

Moreover, the second wall portion 7b is arranged on the back surface of the first wall portion 7a, that is, on a surface opposite to the surface where the predetermined cell 9a of the first wall portion 7a is defined, and a porosity of the second wall portion is higher than that of the first wall portion 7a and the third wall portion 7c, and is a value of 60% or more.

The third wall portion 7c is a porous body arranged on the back surface of the second wall portion 7b, that is, on the surface of the second wall portion 7b opposite to the side on which the first wall portion 7a is arranged, and the third wall portion has an average pore diameter of 1 to 15 μm and a porosity of 50 to 90%.

A honeycomb filter 1 of the present invention constituted in this manner realizes a high trapping efficiency, and the filter can continuously be regenerated during use of the filter, so that a pressure loss can be reduced.

That is, when an exhaust gas containing a particulate ratter (PM) flows into the honeycomb filter of the present invention, as a porous body for use in the filter, the first wall portion provided with pores having a comparatively large average pore diameter traps the PM. Then, the PM trapped by this first wall portion is oxidized and removed by a catalyst carried in the pores, whereby the filter is regenerated.

In this case, the oxidation catalyst of the first wall portion also oxidizes nitrogen monoxide (NO) contained in the exhaust gas to form nitrogen dioxide ($NO_2$). The oxidation of the PM contained in the exhaust gas is also promoted by nitrogen dioxide formed in this manner, and the regeneration of the filter is further effectively performed.

It is to be noted that as described above, the first wall portion is provided with the pores having a comparatively large average pore diameter, so that a part of the PM, for example, the PM having small particle diameters sometimes passes through the pores of the first wall portion. The PM which has passed through the first wall portion in this manner is trapped by the third wall portion arranged on a downstream side of the first wall portion, and the trapped PM is oxidized and removed by nitrogen dioxide formed by the first wall portion.

However, in a case where it is constituted that the exhaust gas which has passed through the first wall portion directly flows into the third wall portion, the exhaust gas is locally concentrated on the third wall portion corresponding to an outlet position of the pores of the first wall portion, and an area of a portion of the third wall portion where the exhaust gas substantially flows in is remarkably reduced, so that the pressure loss of the honeycomb filter largely increases.

The honeycomb filter of the present invention is constituted so that the exhaust gas which has passed through the first wall portion once flows into the second wall portion having a porosity higher than that of the first and third wall portions and having a porosity of 60% or more. Therefore, the second wall portion functions as a buffer, and the exhaust gas is allowed to pass through the second wall portion so as to apply a more uniform pressure to a broad region of the surface of the third wall portion. In consequence, it can be prevented that the exhaust gas locally flows into the third wall portion, and the pressure loss of the whole honeycomb filter can satisfactorily be suppressed. A part of the PM which has passed through the first wall portion is oxidized and removed by nitrogen dioxide formed in the first wall portion even in this second wall portion, so that an amount of the PM to be removed by the third wall portion can be reduced, and rise of the pressure loss can further be suppressed.

Heretofore, a honeycomb filter for use in a DPF or the like cannot continuously be regenerated, and the honeycomb filter has to be heated to oxidize and remove a PM accumulated on partition walls. Specifically, for example, there is a method in which a fuel is excessively supplied to an engine to burn and remove the PM accumulated on the partition walls of the honeycomb filter, but such a method has a problem that the fuel is excessively consumed and that a fuel consumption ratio of the engine accordingly worsens.

Moreover, such a conventional honeycomb filter is periodically regenerated in a stage in which a predetermined amount of PM is accumulated on the partition walls. Therefore, the pressure loss of the honeycomb filter constantly continues to increase in a period until the regeneration is performed, and an engine performance and the fuel consumption ratio are deteriorated until the filter is regenerated.

In the honeycomb filter of the present invention, as described above, it is constituted that the filter can constantly be regenerated during the use of the filter by the oxidation catalyst carried in the pores of the first wall portion and nitrogen dioxide formed by oxidizing nitrogen monoxide, so that the pressure loss of the honeycomb filter can be kept at a predetermined level, and the rise of the pressure loss can effectively be prevented. That is, a special regenerating operation is not periodically required, and a filter performance close to an initial state can constantly be exerted.

It is to be noted that in the present description, the "average pore diameter" is an average value of 50 pores having a length of a line extending in a pore space portion along a line parallel to a partition wall in a sectional SEM photograph of the honeycomb filter. The average value is the average pore diameter of the wall portion having a depth (a length from the surface). Moreover, the "porosity" is a ratio of the total of the lengths of the lines extending in the pore space portions with respect to the lengths of all the lines having a length of 3 mm or sore in parallel with the partition wall in the sectional SEM photograph of the honeycomb filter. The above ratio is the porosity of the wall portion having the depth.

Such a honeycomb filter of the present invention can preferably be used as a diesel particulate filter (DPF) which purifies the exhaust gas discharged from a diesel engine.

It is to be noted that there is not any special restriction on the honeycomb filter of the present invention, but it is preferable that a hydraulic diameter of the predetermined cell, that is, a cell opened on the inflow side, is equal to or larger than that of the remaining cell, that is, the cell opened on the outflow side. According to such a constitution, an initial pressure loss of the honeycomb filter can be reduced, and an exhaust gas treatment capability such as the trapping efficiency can be improved.

[1-1] Honeycomb Structure:

A honeycomb structure constituting a honeycomb filter of the present invention includes porous partition walls, and fluid passages partitioned by the partition walls. In the honeycomb filter of the present invention, one opening end portion of each cell formed in this honeycomb structure is plugged by a plugging portion to constitute the filter.

[1-1a] Partition Wall:

The partition walls constituting the honeycomb structure are constituted of a porous body to partition the cells constituting the fluid passages.

As described above, at least a part of the partition walls in the honeycomb filter of the present invention is constituted of a porous layer in which at least three wall portions of a first wall portion, a second wall portion, and a third wall portion are laminated in a thickness direction of the partition walls from a surface side where predetermined cells are defined.

That is, a PM is trapped in pores of the first wall portion, and the PM is oxidized and removed by a function of an oxidation catalyst carried in the pores. Furthermore, the PM which has passed through the pores of the first wall portion passes through the second wall portion which functions as a buffer layer, and is then trapped by pores of the third wall portion having a smaller average pore diameter, and carbon monoxide contained in an exhaust gas is oxidized and removed by nitrogen dioxide oxidized by the oxidation catalyst.

It is to be noted that in the honeycomb filter of the present invention, there may not be any clear boundary portions among the first, second and third wall portions, and an average pore diameter and a porosity gradually change to constitute three layers. In such a case, regions in which the average pore diameter and the porosity satisfy the above wall portion requirements constitute the first wall portion, the second wall portion, and the third wall portion, respectively.

[1-1a-1] First Wall Portion:

The first wall portion is arranged on the surface side of the partition wall which defines a predetermined cell having an opening end portion opened on an inflow side and an opening end portion plugged on an outflow side. That is, this first wall portion directly defines the predetermined cell.

Then, this first wall portion is constituted of a porous body having an average pore diameter of 20 μm or more, and the oxidation catalyst is carried on inner surfaces of formed pores.

A value of the average pore diameter of the pores in this first wall portion is large as compared with an average pore diameter (for example, about 10 μm or more and below 20 μm) of partition walls of a heretofore known honeycomb filter. Therefore, the trapping efficiency of the first wail portion alone is lowered, but the PM is not accumulated to such an extent that the pores of the first wall portion are clogged with the trapped PM. The trapped PM can be oxidized and removed by the oxidation catalyst carried on the inner surfaces of the pores, before the PM is accumulated even on the surfaces of the partition walls (that is, the surface of the first wall portion) to raise the pressure loss of the filter.

Such a first wall portion can be formed using, for example, cordierite, silicon carbide (SiC), alumina titanate, silicon nitride, mullite, a sintered metal or the like.

Moreover, this first wall portion may be constituted of a fibrous porous material. Specific examples of the material include a porous body constituted of a fiber containing alumina, alumina silicate, silica or the like as a main component, and a material including a biologically soluble fiber. For example, when an alumina silicate fiber is used as the fibrous porous material, the fiber having a fiber diameter of 4 to 9 μm and a fiber length of 30 to 500 μm is preferably usable.

It is to be noted that the biologically soluble fiber does not have any durability in a physiological solution. Examples of the physiological solution include physiological saline (a 0.9% sodium chloride solution), a buffer solution, a pseudo body fluid, and a serum. The pseudo body fluid is an aqueous solution substantially equal to a human plasma component.

There is not any special restriction on a thickness of the first wall portion. However, the thickness is preferably 50 to 90%, further preferably 70 to 90%, especially preferably 70 to 80% with respect to a thickness of the whole partition wall.

The preferable range of the thickness of the first wall portion differs, depending on the size of the honeycomb structure, the shape of the cell, the thickness of the partition wall or the like. The thickness is, for example, preferably 150 to 300 μm, further preferably 210 to 270 μm, especially preferably 210 to 240 μm.

Moreover, the average pore diameter of the first wall portion is preferably 20 to 300 μm, further preferably 25 to 300 μm, especially preferably 40 to 100 μm. According to such a constitution, the rise of the pressure loss can satisfactorily be suppressed. It is to be noted that the average pore diameter of the first wall portion is set to 25 μm or more, whereby the pores of the first wall portion is not easily clogged with the PM contained in the exhaust gas, and the PM trapped in the pores can efficiently be oxidized and removed. On the other hand, when the average pore diameter of the first wall portion is set to 300 μm or less, the pore diameters of the first wall portion are not excessively large, and the partition walls are not easily broken. It is to be noted that when the honeycomb structure of the present invention is used as, for example, the DPF, the average pore diameter of the first wall portion is preferably 20 to 100 μm.

Moreover, there is not any special restriction on the porosity of the first wall portion, but the porosity is preferably 45 to 75%, further preferably 50 to 65%. According to such a constitution, much wore PM can be oxidized and removed by this first wall portion, whereby a high trapping efficiency is realized, and the rise of the pressure loss can satisfactorily be suppressed.

The average pore diameter and porosity of the first wall portion can be adjusted in accordance with particle diameters and a particle diameter distribution of a raw material to be used in a clay for forming the honeycomb structure, particle diameters and a particle diameter distribution of a pore former contained in the raw material, a firing temperature of a formed body obtained by forming the clay and the like.

Moreover, there is not any special restriction on the honeycomb filter of the present invention, but a volume ratio of the pores having a pore diameter below 10 μm with respect to the pores of the first wall portion is preferably below 10%, further preferably below 5%. According to such a constitution, the pores of the first wall portion are not easily clogged with the PM, and the increase of the pressure loss can effectively be suppressed. Moreover, when the catalyst is carried, first a catalyst coat slurry is more preferentially and easily absorbed by small pores owing to a capillary phenomenon, and an amount of a catalyst coat on the surface of a large pore is not sufficient, whereby the catalyst is non-uniformly distributed as a whole configuration. This is a factor for deteriorating the performance of the catalyst. Therefore, the volume ratio of the pores having a pore diameter below 10 μm is set below the above range to improve the catalyst performance.

It is to be noted that the volume ratio of the pores having the pore diameters below 10 μm with respect to the pores of the first wall portion can be obtained by measuring a ratio of the number of lines extending in a pore space portion along a line parallel to a partition wall and having a length below 10 μm with respect to all lines extending in the space in a sectional SEM photograph of the honeycomb filter.

Moreover, as the catalyst to be carried on the inner surfaces of the pores of this first wall portion, a catalyst similar to the oxidation catalyst for use in oxidizing the PM in the heretofore known DPF or the like is suitably usable. It is to be noted that there is not any special restriction on the catalyst, but in the honeycomb filter of the present invention, a catalyst including at least one selected from the group consisting of platinum, palladium, and ceria is suitably usable.

Furthermore, there is not any special restriction on the amount of the catalyst to be carried in the pores of the first wall portion, but the amount is preferably 0.2 to 3 g/liter per total volume of the honeycomb filter.

Figure 4:
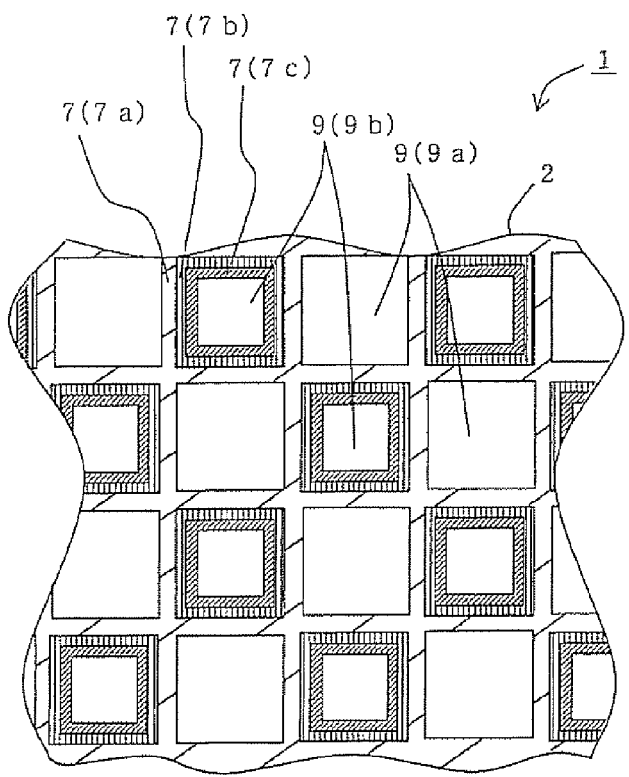
FIG. 4 is an enlarged sectional view showing a section of another embodiment of the honeycomb filter of the present invention cut along a face vertical to a cell communicating direction.

It is to be noted that the honeycomb filter 1 shown in FIGS. 2 and 4 shows an example of a case where a main portion (namely, a portion constituting a skeleton of the honeycomb structure) of the partition walls 7 constituting a honeycomb structure 2 is constituted of the first wall portion 7a, and the second wall portion 7b and the third wall portion 7c are laminated on the back surface of this first wall portion 7a in the thickness direction of the partition walls 7. However, for example, the main part of the partition walls constituting the honeycomb structure may be constituted of the third wall portion, and the second wall portion and the first wall portion may be laminated on the front surface of this third wall portion in the thickness direction of the partition walls. Here, FIG. 4 is an enlarged sectional view showing a section of another embodiment of the honeycomb filter of the present invention cut along a face vertical to a cell communicating direction. It is to be noted that in FIG. 4, elements similar to those of an absorbing material shown in FIG. 2 are denoted with the same reference numerals, and the description thereof is omitted.

[1-1a-2] Second Wall Portion:

The second wall portion is arranged on the back surface of the first wall portion, and a porosity thereof is higher than that of the first wall portion and the third wall portion, and is a value of 60% or more. This second wall portion is a layer which functions as a buffer layer when the exhaust gas which has passed through the first wall portion flows into the third wall portion.

The exhaust gas which has passed through the first wall portion is allowed to pass through the second wall portion, whereby the exhaust gas easily flows into the third wall portion, and the pressure loss of the honeycomb filter can be lowered.

It is to be noted that in the honeycomb filter of the present invention, the porosity of the second wall portion is preferably 64% or more, further preferably 80% or more. According to such a constitution, the satisfactory flow of the exhaust gas from the first wall portion to the third wall portion can be secured.

It is to be noted that such a second wall portion can be formed using a material obtained by adding, to a material similar to the material for forming the first wall portion, such an amount of known pore former or the like that the resultant porosity of the porous body is the above value.

Moreover, this second wall portion may be constituted of the fibrous porous material in the same manner as in the first wall portion. Specific example of the material include a porous body constituted of a fiber containing alumina, alumina silicate, silica or the like as a main component, and a material containing a biologically soluble fiber. For example, the honeycomb filter 1 shown in FIG. 5 shows an example of a case where the second wall portion 7b is constituted of the fibrous porous material.

Furthermore, the second wall portion in the honeycomb filter of the present invention may be constituted of a void having a porosity of 100%, that is, a void formed between the first wall portion and the third wall portion. According to such a constitution, the remarkably satisfactory flow of the exhaust gas from the first wall portion to the third wall portion can be secured. Moreover, such a capacity of the second wall portion that the exhaust gas can reside increases, and the oxidation and removal of the PM by nitrogen dioxide in this second wall portion is promoted. In consequence, the amount of the PM to be treated (oxidized and removed) in the third wall portion can be reduced, and the rise of the pressure loss due to the third wall portion can be minimized. For example, the honeycomb filter 1 shown in FIG. 6 shows an example of a case where the second wall portion 7b is constituted of a void formed between the first wall portion 7a and the third wall portion 7c.

Figure 5:
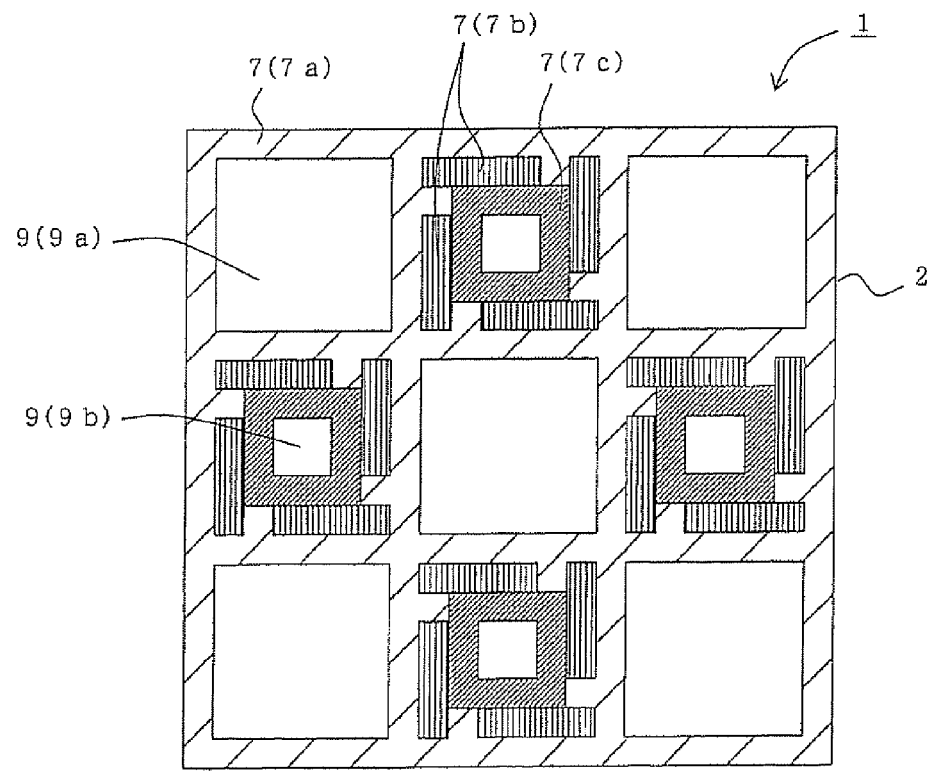
FIG. 5 is an enlarged sectional view showing a section of still another embodiment of the honeycomb filter of the present invention cut along a face vertical to a cell communicating direction.
Figure 6:
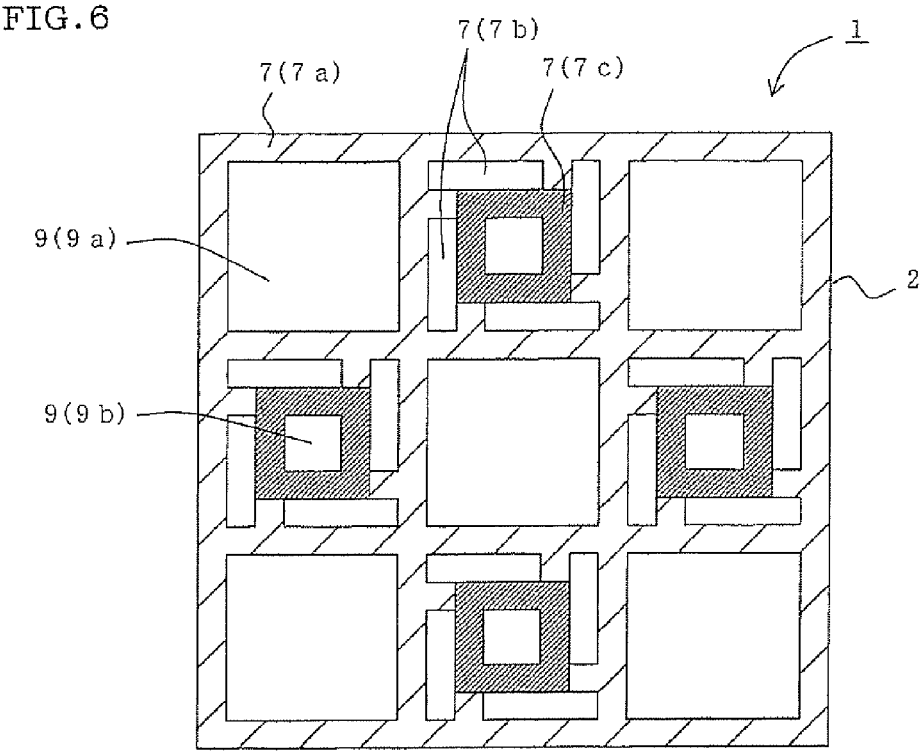
FIG. 6 is an enlarged sectional view showing a section of a further embodiment of the honeycomb filter of the present invention cut along a face vertical to a cell communicating direction.

Here, FIGS. 5 and 6 are enlarged sectional views showing a section of another embodiment of the honeycomb filter of the present invention cut along a face vertical to a cell communicating direction. It is to be noted that in FIGS. 5 and 6, elements similar to those of an absorbing product shown in FIG. 2 are denoted with the same reference numerals, and the description thereof is omitted.

Moreover, the preferable range of the thickness of the second wall portion differs, depending on the size of the honeycomb structure, the shape of the cell, the thickness of the partition wall or the like. However, the thickness is preferably 20 to 300 μm, further preferably 50 to 200 μm, especially preferably 50 to 100 μm. According to such a constitution, the satisfactory flow of the exhaust gas from the first wall portion to the third wall portion can be secured.

[1-1a-3] Third Wall Portion:

The third wall portion constituting the partition wall is arranged on the back surface of the second wall portion, and the third wall portion has an average pore diameter of 1 to 15 μm and a porosity of 50 to 90%. It is to be noted that in a case where the second wall portion is simply constituted of a void, the third wall portion is arranged on the back surface of the first wall portion in a state in which a gap corresponding to the second wall portion is made.

This third wall portion is a porous body which traps the PM which cannot completely be oxidized and removed by the first wall portion and which oxidizes and removes the trapped component to purify the exhaust gas.

This third wall portion is constituted of a porous body having an average pore diameter smaller than that of the first wall portion, and can satisfactorily trap the PM which has passed through the pores of the first wall portion. It is to be noted that the PM trapped by the third wall portion is constantly continuously oxidized and removed by nitrogen dioxide formed by oxidizing nitrogen monoxide contained in the exhaust gas.

Such a third wall portion can be formed by, for example, using a material similar to that of the first wall portion and adjusting the amount of the pore former or the like so that the average pore diameter and porosity of the resultant porous body have the above values. The third wall portion nay be constituted of a fibrous porous material. Specific examples of the material include a porous body constituted of a fiber containing alumina, alumina silicate, silica or the like as a main component, and a material containing a biologically soluble fiber.

It is to be noted that in a case where the third wall portion is formed using the above-mentioned fibrous porous material, the third wall portion is preferably formed using, in the fibrous porous material, a slurry to which an oxide such as silica has been added as a small amount of a fiber bonding component.

Furthermore, the third wall portion of the honeycomb filter of the present invention has an average pore diameter of 1 to 15 μm preferably 3 to 8 μm, further preferably 5 to 8 μm. According to such a constitution, the rise of the pressure loss of the honeycomb filter can be suppressed, and the trapping efficiency can be improved.

It is to be noted that when the average pore diameter is below 1 μm, the average pore diameter becomes excessively small, and the pressure loss in the initial state (a state in which any PM is not accumulated on the partition walls) of the honeycomb filter sometimes increases. Moreover, the pressure loss during the purification of the exhaust gas sometimes easily increases. On the other hand, when the average pore diameter exceeds 15 μm, the trapping efficiency of the honeycomb filter sometimes lowers.

Moreover, the third wall portion has a porosity of preferably 50 to 85%, further preferably 50 to 80%, especially preferably 60 to 80%. According to such a constitution, the PM contained in the exhaust gas which flows into the third wall portion can satisfactorily be removed.

It is to be noted that there is not any special restriction on the thickness of the third wall portion, but the thickness is, for example, preferably 10 to 200 μm, further preferably 30 to 150 μm. According to such a constitution, while a high trapping efficiency is realized, the rise of the pressure loss can effectively be suppressed. It is to be noted that in a case where the thickness of the third wall portion is excessively small, the PM which has passed through the first wall portion cannot completely be trapped, and the trapping efficiency sometimes lowers. On the other hand, when the third wall portion is excessively thick, the initial pressure loss of the honeycomb filter sometimes increases.

The porous body (the third wall portion) having such an average pore diameter is sometimes used as a single porous body as the partition wall of the conventional honeycomb filter, but in a case where honeycomb filter wherein the partition wall is constituted only of the porous body having such pore diameters is used as a DPF which purifies the exhaust gas to be discharged from the diesel engine, the amount of PM contained in the exhaust gas is large, and a large amount of PM having comparatively large particles is contained. Therefore, the pores are clogged with the PM in a short time, and the pressure loss rapidly increases. In consequence, such a conventional honeycomb filter has to be frequently regenerated.

In the honeycomb filter of the present invention, a large part of PM contained in the exhaust gas including the PM having comparatively large particle diameters can beforehand be oxidized and removed by the above-mentioned first wall portion. Therefore, the PM which has to be actually oxidized and removed by the third wall portion is a part of the PM included in the exhaust gas, and even in the porous body having the above-mentioned average pore diameter and porosity, the PM can sufficiently continuously be treated.

[1-1a-4] Fourth Wall Portion:

In the honeycomb filter of the present invention, the above-mentioned partition wall may further have a fourth wall portion arranged on the back surface of the third wall portion. This fourth wall portion has an average pore diameter of 20 μm or more, and an oxidation catalyst is carried on the inner surfaces of the formed pores.

The filter further has such a fourth wall portion, whereby carbon monoxide (CO) and hydrocarbon (HC) in the exhaust gas can be oxidized and purified into harmless carbon dioxide ($CO_2$) and water ($H_2O$).

Figure 7:
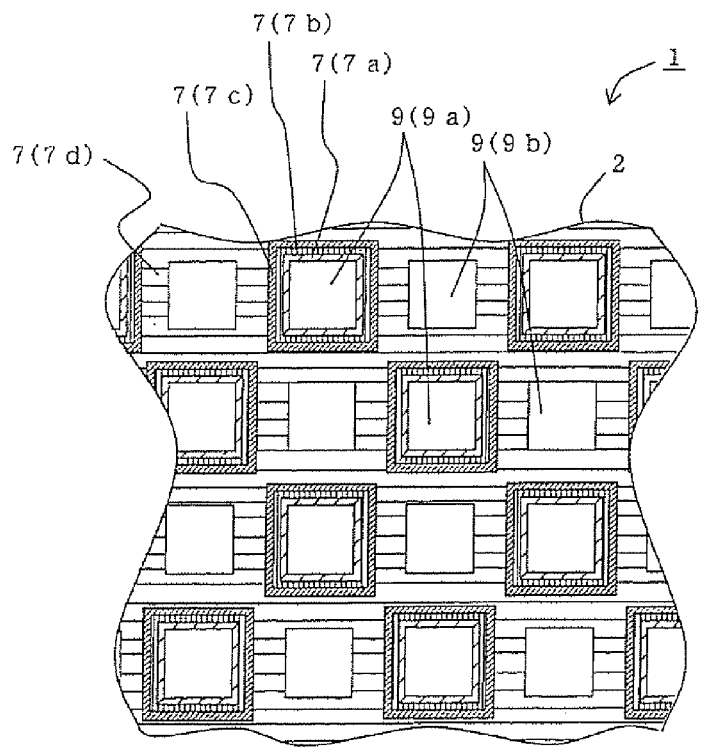
FIG. 7 is an enlarged sectional view showing a section of a further embodiment of the honeycomb filter of the present invention cut along a face vertical to a cell communicating direction.
Figure 8:
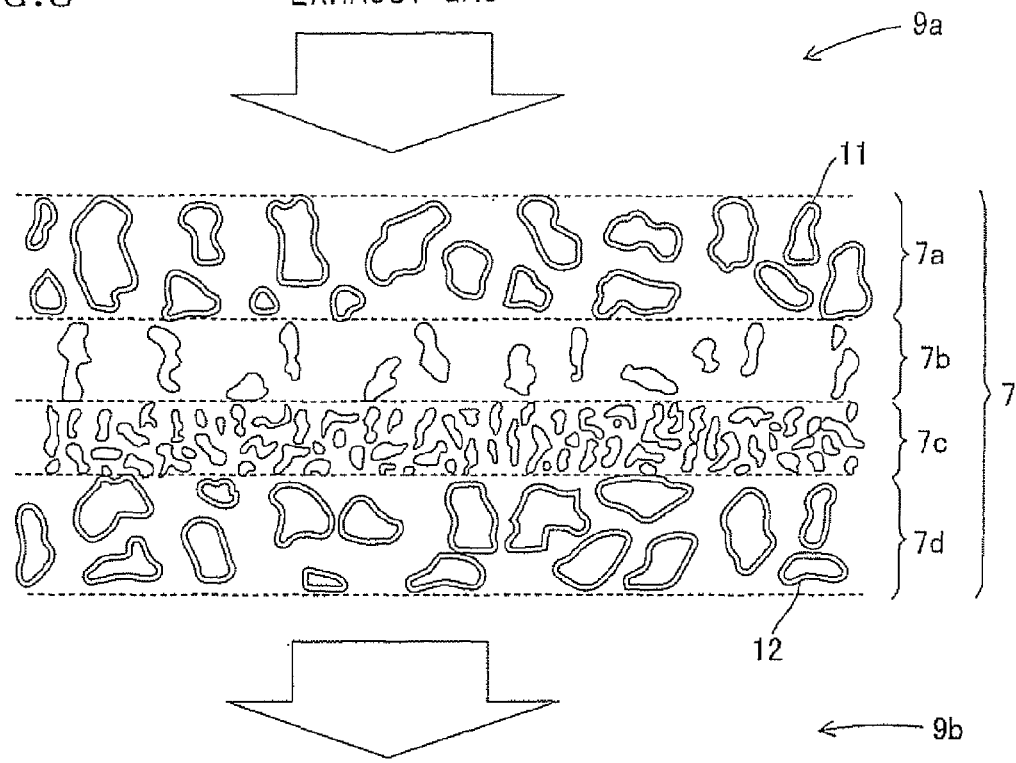
FIG. 8 is an enlarge sectional view showing a section of a partition wall of the honeycomb filter shown in FIG. 7 cut along a face vertical to a cell defining surface.

For example, the partition walls 7 of the honeycomb filter 1 shown in FIGS. 7 and 8 shows an example of a case where four wall portions of the first wall portion 7a, the second wall portion 7b, the third wall portion 7c, and a fourth wall portion 7d are laminated in the thickness direction of the partition walls 7 from the surface side where the predetermined cell 9a having an opening end portion opened on an inflow side is defined. It is to be noted that here, FIG. 7 is an enlarged sectional view showing a section of another embodiment of the honeycomb filter of the present invention cut along a face vertical to the cell communicating direction. FIG. 6 is an enlarged sectional view showing a section of the partition wall of the honeycomb filter shown in FIG. 7 cut along a face vertical to the surface which defines the cell. It is to be noted that reference numeral 12 is an oxidation catalyst.

It is to be noted that as this fourth wall portion, the porous body constituted in the same manner as in the first wall portion described above may be used. For example, the average pore diameter of the fourth wall portion is preferably 20 to 300 μm, further preferably 40 to 100 μm. According to such a constitution, a gas component such as carbon monoxide described above can satisfactorily be purified. It is to be noted that when the honeycomb structure of the present invention is used as, for example, the DPF, the average pore diameter of the fourth wall portion is preferably 20 to 100 μm.

The preferable range of the thickness of this fourth wall portion differs, depending on the size of the honeycomb structure, the shape of the cell, the thickness of the partition wall or the like. However, for example, the thickness is preferably 50 to 300 μm, further preferably 100 to 200 μm, especially preferably 150 to 200 μm. Moreover, there is not any special restriction on the porosity of the fourth wall portion, but the porosity is preferably 45 to 75%, further preferably 50 to 65%. In consequence, the rise of the pressure loss can be suppressed, and a gas component such as carbon monoxide can satisfactorily be purified.

It is to be noted that the fourth wall portion carrying the oxidation catalyst in the same manner as in the first wall portion can additionally carry an Nox occluding reduction catalyst including barium (Ba), potassium (K) and the like, and in this case, purification of Nox can be performed together.

Moreover, in the honeycomb filter of the present invention, this fourth wall portion and the above first wall portion may integrally be constituted. That is, for example, the first wall portion and the fourth wall portion may integrally be formed to constitute the skeleton of the honeycomb structure using a predetermined porous material in a state in which a gap capable of arranging the second and third wall portions is provided between the first wall portion and the fourth wall portion, and the second and third wall portions may be arranged in the gap between the first wall portion and the fourth wall portion to constitute the honeycomb filter.

Figure 9:
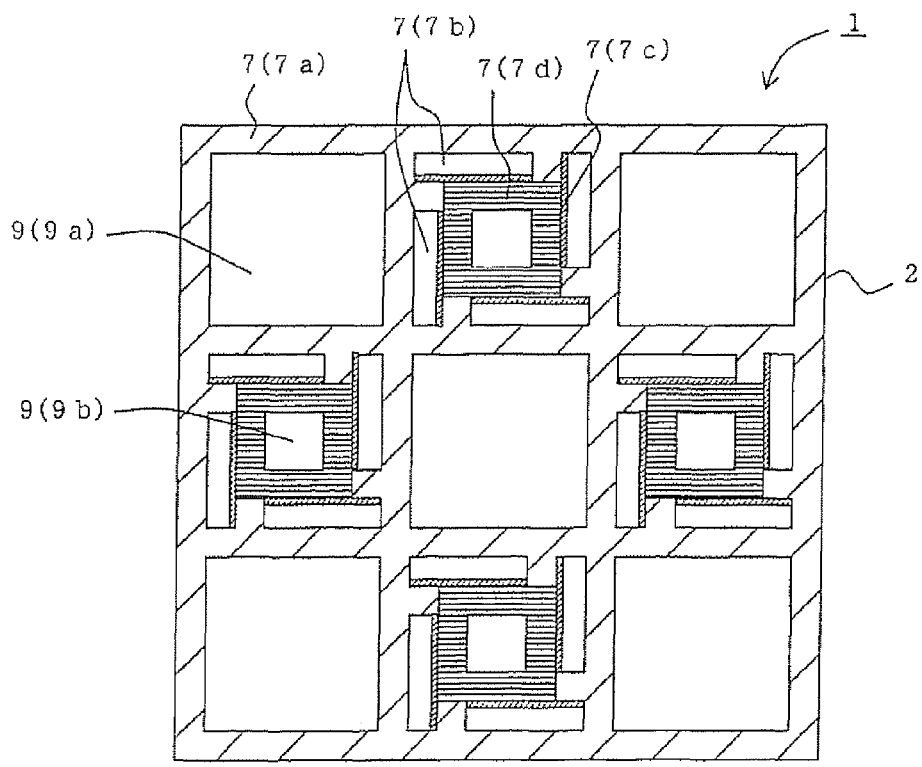
FIG. 9 is an enlarged sectional view showing a section of a further embodiment of the honeycomb filter of the present invention cut along a face vertical to a cell communicating direction.

For example, the honeycomb filter 1 shown in FIG. 9 shows an example of a case where the first wall portion 7a and the fourth wall portion 7d are integrally formed, the film-like third wall portion 7c is arranged on the surface of the fourth wall portion 7d in the gap between the first wall portion 7a and the fourth wall portion 7d, and the second wall portion 7b is constituted of a void between the first wall portion 7a and the third wall portion 7c.

Figure 10:
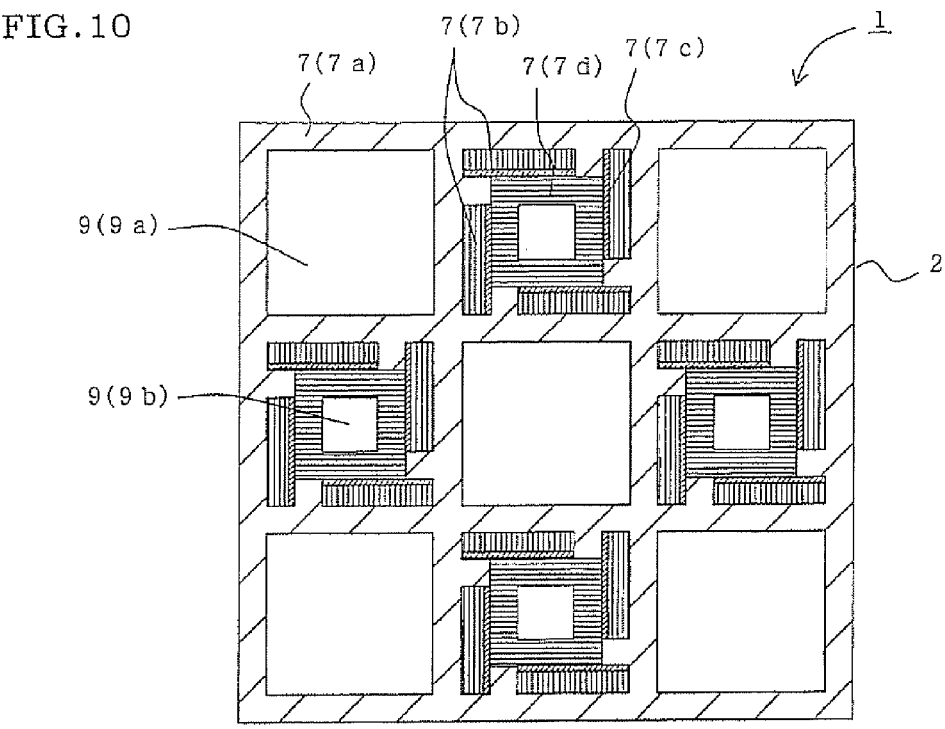
FIG. 10 is an enlarged sectional view showing a section of a further embodiment of the honeycomb filter of the present invention cut along a face vertical to a cell communicating direction.

Moreover, for example, the honeycomb filter 1 shown in FIG. 10 shows an example of a case where the first wall portion 7a and the fourth wall portion 7d are integrally formed, and the second wall portion 7b constituted of a fibrous porous material and the film-like third wall portion 7c are arranged in a gap between the first wall portion 7a and the fourth wall portion 7d.

Here, FIGS. 9 and 10 are enlarged sectional views showing a section of another embodiment of the honeycomb filter of the present invention cut along a face vertical to the cell communicating direction. It is to be noted that in FIGS. 9 and 10, elements similar to those of the absorbing product shown in FIG. 7 are denoted with the same reference numerals, and the description thereof is omitted.

[1-1b] Cell:

The cells partitioned by the partition walls constituting the honeycomb structure function as passages of a fluid, especially an exhaust gas. The exhaust gas which has flowed into the cell (the predetermined cell) opened on the inflow side is purified while the gas passes through the partition wall partitioning the cell to move to the adjacent cell (the remaining cell) opened on the outflow side.

Figure 11:
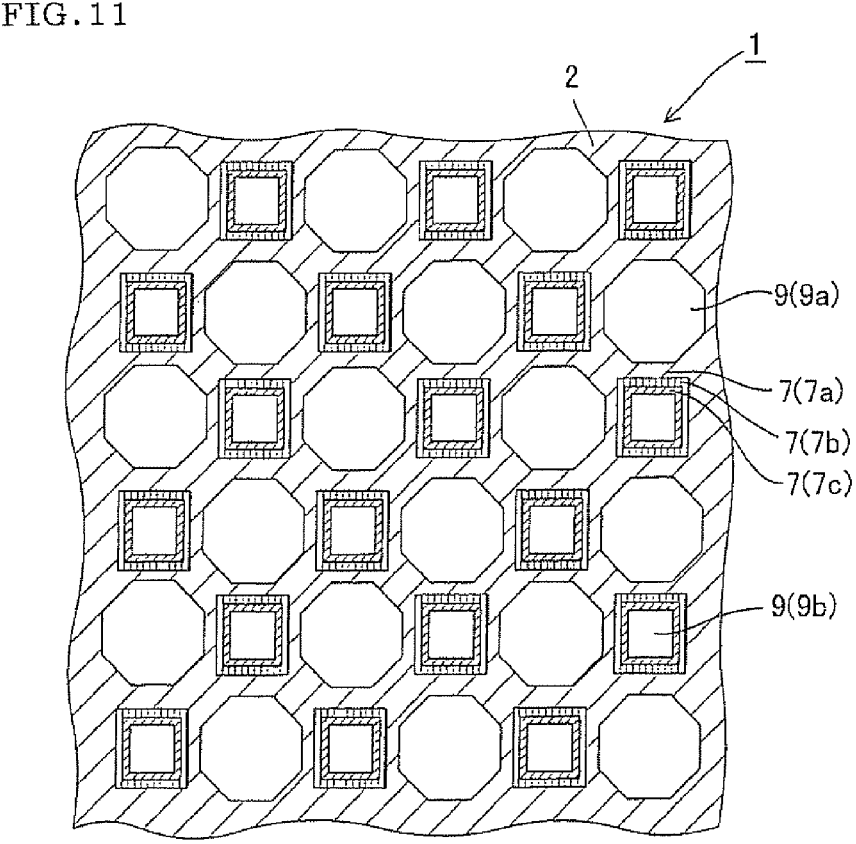
FIG. 11 is an enlarged sectional view showing a section of a further embodiment of the honeycomb filter of the present invention cut along a face vertical to a cell communicating direction.
Figure 12:
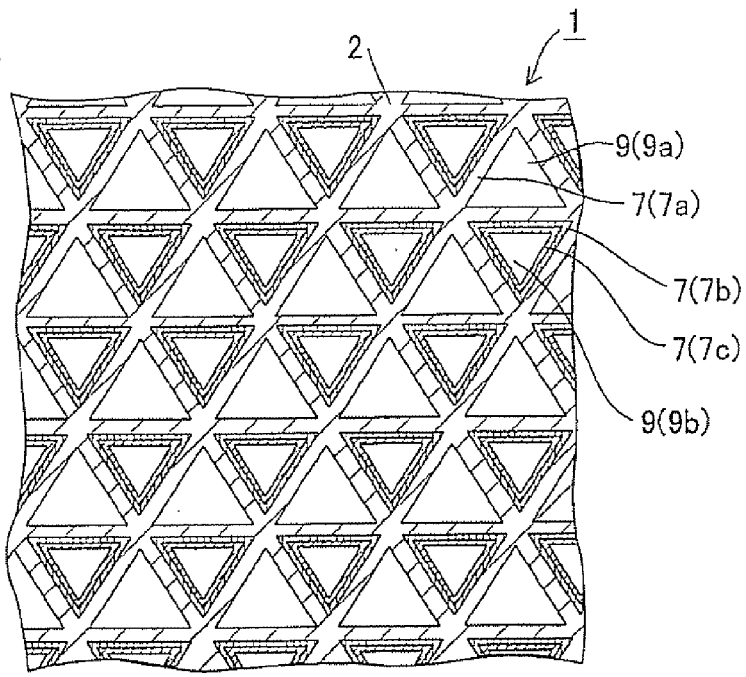
FIG. 12 is an enlarged sectional view showing a section of a still further embodiment of the honeycomb filter of the present invention cut along a face vertical to a cell communicating direction.

There is not any special restriction on the shape of the cell (the shape of the section vertical to the axial direction of the cell), but one of a triangular shape, a quadrangular shape and a combination of the quadrangular shape and an octagonal shape is preferable. It is to be noted that in the honeycomb filter of the present invention, the shape of the cell is preferably quadrangular. With regard to such a quadrangular cell, the above-mentioned predetermined cells and remaining cells can regularly and alternately be arranged, so that, for example, the predetermined cells having the opening end portion opened on the inflow side are not arranged adjacent to each other. All of the partition walls can be constituted so that at least three wall portions of the first wall portion, the second wall portion, and the third wall portion are laminated in the thickness direction of the partition wall, and the filter can efficiently be regenerated. Here, FIG. 11 shows an example of a honeycomb filter in which the shapes of cells are the combination of the quadrangular shape and the octagonal shape, that is, the quadrangular cells and the octagonal cells are alternately arranged, and FIG. 12 shows an example of a honeycomb filter in which cells have a triangular shape.

Moreover, there is not any special restriction on the cell density of the honeycomb structure constituting the honeycomb filter of the present invention, however the cell density is preferably 5 to 80 cells/cm$^2$, further preferably 14 to 60 cells/cm$^2$.

Furthermore, the thickness of the partition wall which partitions and forms the cell is preferably 200 to 800 µm further preferably 200 to 600 µm, especially preferably 300 to 400 µm.

[1-2] Plugging Portion:

As plugging portions for use in the honeycomb filter of the present invention, plugging portions similar to those heretofore used in a case where the opening end portions of the cells of the honeycomb structure are plugged to use the structure as the filter can be used.

In a case where the section of this plugging portion vertical to the axial direction of the cell is quadrangular, the plugging portions are preferably arranged in the opening end portions of the cells so that the predetermined cells and the remaining cells are alternately arranged.

It is to be noted that this plugging portion is preferably constituted of the same material as that of the partition wall, and it is preferable that the plugging portion is constituted of the same material, the porosity thereof is higher than that of the partition wall, and the Young's modulus thereof is smaller than that of the partition wall In consequence, breakage due to a thermal expansion difference can be prevented.

[2] Manufacturing Method of Honeycomb Filter:

Next, the manufacturing method of the honeycomb filter according to the present invention will specifically be described. To manufacture the honeycomb filter of the present invention, the first the honeycomb structure constituting the honeycomb filter is manufactured.

In a conventional honeycomb structure, the partition walls are constituted of one type of porous material, so that the structure can be manufactured by preparing a forming clay in consideration of the pore diameters and porosity of the resultant honeycomb structure, and extruding and forming the prepared forming clay. However, in the honeycomb structure for use in the honeycomb filter of the present invention, the partition walls are a laminated body in which at least three wall portions are laminated. Therefore, the skeleton of the honeycomb structure (hereinafter sometimes referred to as the "honeycomb structure precursor") formed of one wall portion in layers constituting the partition walls is first manufactured.

When the honeycomb structure precursor is manufactured using the first wall portion, the porous material constituting the above-mentioned first wall portion is mixed and kneaded to prepare the clay for forming the honeycomb structure precursor. For example, a dispersion medium such as water, and a pore former are added to a cordierite forming material, and an organic binder and a dispersant are further added thereto, and kneaded to form a paste clay. There is not any special restriction on means for kneading the cordierite forming material (a forming material) to prepare the forming clay, and examples of the means include methods using a kneader, a vacuum pug mill and the like.

The cordierite forming material is a material which is fired to form cordierite, and is a ceramic material blended so as to obtain a chemical composition in which silica is in a range of 42 to 56 mass %, alumina is in a range of 30 to 45 mass %, and magnesia is in a range of 12 to 16 mass %. Specific examples of the material include a material containing a plurality of inorganic materials selected from the group consisting of talc, kaolin, calcined kaolin, alumina, aluminum hydroxide, and silica at such a ratio as to form the above-mentioned chemical composition.

The pore former may have such a property that the pore former is scattered and eliminated by a firing step. As the pore former, an inorganic substance such as coke, a polymer compound such as a foam resin, an organic substance such as starch or the like may be used alone or in combination.

As the organic binder, hydroxypropyl methyl cellulose, methyl cellulose, hydroxyethyl cellulose, carboxyl methyl cellulose, polyvinyl alcohol or the like may be used. These materials may be used alone or in combination of two or more kinds.

As the dispersant, ethylene glycol, dextrin, fatty acid soap, polyalcohol or the like may be used. These materials may be used alone or in combination of two or more kinds.

Subsequently, the resultant forcing clay is formed into a honeycomb formed body having, for example, the partition wall corresponding to the first wall portion 7a of the honeycomb filter 1 shown in FIG. 4.

There is not any special restriction on a method for preparing the honeycomb formed body, and a heretofore known forming method such as extrusion forming, injection forming, or press forming may be used. Above all, suitable examples include the method of extrusion forming of the forming clay prepared as described above using a die having a desired cell shape, a desired partition wall thickness, and a desired cell density.

It is to be noted that in this case, on one surface (the back surface) of the first wall portion, at least the second wall portion and third wall portion in the honeycomb filter of the present invention are arranged to form the partition wall, and hence the honeycomb formed body is manufactured so that the hydraulic diameter of the cell defined by the back surface of the first wall portion is larger than that of the cell in a final product.

Subsequently, the resultant honeycomb formed body is dried. There is not any special restriction on a drying method, but a heretofore known drying method such as hot air drying, microwave drying dielectric drying, reduced pressure drying, vacuum drying, or freeze drying may be used. Above all, a drying method in which the hot air drying is combined with the microwave drying or the dielectric drying is a preferable example because the whole formed body can quickly and uniformly be dried.

Subsequently, the resultant honeycomb dried body is calcined to manufacture a calcined body before the body is actually fired. The calcination is an operation of burning and eliminating an organic matter (for example, the organic binder, the dispersant, the pore former or the like) in the honeycomb formed body. In general, the burning temperature of the organic binder is about 100 to 300° C., and the burning temperature of the pore former is about 200 to 800% C so that a calcination temperature may be set to about 200 to 1000° C. There is not any special restriction on a calcination time, but the time is preferably about 10 to 100 hours.

Subsequently, the resultant calcined body is fired (actually fired) to obtain the honeycomb structure precursor. In the present invention, the actual firing is an operation of sintering and densifying a forming material in the calcined body to secure a predetermined strength. The firing conditions (a temperature and a time) differ in accordance with the type of the forming material, and hence appropriate conditions may be selected in accordance with the type of the material. When, for example, the cordierite forming material is fired, the material is preferably fired at 1410 to 1440° C. Moreover, the firing time is appropriately about 3 to 10 hours.

The honeycomb structure precursor can be obtained in this manner. It is to be noted that the partition wall of this honeycomb structure precursor is the first wall portion of the honeycomb structure constituting the honeycomb filter of the present invention. Therefore, by the following method, the second wall portion and the third wall portion are formed on the partition wall of the resultant honeycomb structure precursor, that is, the back surface of the first wall portion in the honeycomb filter of the present invention.

To form the second wall portion and the third wall portion, the opening end portions of the cells in the end face of the honeycomb structure precursor are applied with a mask in a checkered pattern by being alternately closed. The above mask is applied so as to close the opening end portion of the cell defined by the front surface of the first wall portion, that is, so as to open the opening end portion of the cell defined by the back surface of the first wall portion.

Afterward, a slurry containing a forming material for forming the second wall portion (hereinafter sometimes referred to as a slurry for the second wall portion) is poured into the opening end portion of the cell which is not masked, to form a layer made of the slurry for the second wall portion on the back surface of the first wall portion. This layer is the second wall portion constituting the partition wall. To form the layer made of the slurry for the second wall portion, an excessive slurry is preferably blown off with air to form a layer having a predetermined thickness.

As this slurry for the second wall portion, a slurry prepared by adding water or alcohol to the cordierite forming material containing large amounts of organic binder and pore former may be used. The amounts of the organic binder and the pore former are set to amounts larger than those used in manufacturing the first wall portion, and such amounts that the porosity of the resultant porous body is 60% or more when the layer formed of this slurry for the second wall portion is dried or fired.

It is to be noted that in a case where the second wall portion constituted of a fibrous porous material is formed, a slurry may be used in which the fibrous porous material is mixed with an oxide for bonding and water or alcohol.

Afterward, the mask arranged on the end face of the honeycomb structure is peeled to dry the layer made of the slurry for the second wall portion. There is not any special restriction on drying conditions, but the layer is dried at, for example, 90 to 130° C. for about 1 to 3 hours. In consequence, the layer made of the slurry for the second wall portion becomes the second wall portion.

Subsequently, again, the opening end portions of the cells in the end face of the honeycomb structure precursor are applied with a mask in a checkered pattern by being alternately closed.

Afterward, a slurry containing a forming material for forming the third wall portion (hereinafter sometimes referred to as a slurry for the third wall portion) is poured into the opening end portion of the cell which is not masked, to form a layer made of the slurry for the third wall portion on the back surface of the second wall portion. This layer becomes the third wall portion constituting the partition wall.

As this slurry for the third wall portion, a slurry prepared by adding water or alcohol to the cordierite forming material containing large amounts of organic binder and pore former may be used. The amounts of the organic binder and the pore former are set to such amounts that the resultant porous body has an average pore diameter of 1 to 15 µm and a porosity of 50 to 90% when the layer formed of the slurry for the third wall portion is dried or fired.

The resultant layer made of the slurry for the third wall portion in this manner is dried in the same manner as in the layer made of the slurry for the second wall portion. In consequence, the layer made of the slurry for the third wall portion becomes the third wall portion.

It is to be noted that, for example, as shown in FIG. 6, in a case where the second wall portion 7b is constituted of a void formed between the first wall portion 7a and the third wall portion 7c, the partition wall is formed into the shape of the first wall portion 7a and the third wall portion 7c shown in FIG. 6, that is, a shape provided with a void corresponding to the second wall portion 7b, by use of a material for forming the first wall portion 7a. Afterward, a portion corresponding to the third wall portion 7c is further impregnated with a slurry for forming small pores so that the portion has an average pore diameter of 1 to 15 µm and a porosity of 50 to 90%, to form the third wall portion 7c.

It is to be noted that as a method for selectively impregnating a part of the partition walls with the slurry, a sheet provided with holes is attached to a portion where the slurry is to be poured. Alternatively, the sheet is attached, and then the holes are made in necessary portions, whereby the slurry may be poured via this sheet.

As described above, the honeycomb structure can be obtained in which at least a part of the partition walls is constituted by laminating at least three wall portions of the first wall portion, the second wall portion and the third wall portion in the thickness direction of the partition wall.

It is to be noted that to manufacture the honeycomb filter of the present invention, after forming the third wall portion, if necessary, the fourth wall portion may be formed on the back surface of the third wall portion. Also to form the fourth wall portion, in the same manner as in the third wall portion or the like, a slurry containing a predetermined forming material (hereinafter sometimes referred to as a slurry for the fourth wall portion) is poured into the opening end portion of the cell which is not masked, to form a layer made of the slurry for the fourth wall portion on the back surface of the third wall portion. This layer becomes the fourth wall portion constituting the partition wall.

Afterward, the pores of the first wall portion are coated with an oxidation catalyst containing beta alumina as a main component carried with platinum particles on the surfaces thereof. Beta alumina may additionally be mixed with an oxide such as zirconia or ceria. There is not any special restriction on a method for carrying the oxidation catalyst, and a method for carrying the catalyst in the heretofore known honeycomb filter may be used. Specifically, for example, first a catalyst slurry containing the oxidation catalyst to be carried is prepared. Subsequently, the surfaces of the pores of the first wall portion in the partition wall of the honeycomb structure are coated with this catalyst slurry by a method such as a suction method. Afterward, the portion is dried at room temperature or under heating conditions.

Moreover, the crushed particle diameters of alumina are adjusted, and the crushed alumina is mixed with water or alcohol and formed into a slurry. A slurry solution is sucked so as to flow from the first wall portion side to the third wall portion side, whereby a large part of the alumina particles can be trapped in the pores of the first wall portion. This material is dried, whereby the inner surfaces of the pores in the first wall portion can be coated with the oxidation catalyst. Even in a case where a small amount of the oxidation catalyst reaches the second wall portion, the second wall portion has a high porosity, and hence a problem such as the rise of the pressure loss does not occur.

It is to be noted that in a case where the fourth wall portion is formed on the back surface of the third wall portion, the oxidation catalyst is carried even in the pores of this fourth wall portion by a method similar to the above method.

Afterward, the opening end portion of the predetermined cell on a side where the fluid flows out (the outflow side) and the opening end portion of the remaining cell on a side where the fluid flows in (the inflow side) are plugged by the plugging portions. There is not any special restriction on a plugging method, and a method similar to a method for plugging the opening end portion of the cell of the honeycomb structure in the heretofore known honeycomb filter is preferably usable.

For example, as the plugging method, first the mask is attached to one end face of the honeycomb structure. The mask can be attached by attaching an adhesive sheet to one end face of the honeycomb structure, and faking holes only in portions of the adhesive sheet corresponding to the cells to be plugged by laser processing in which image processing is used. Subsequently, the one end face of the honeycomb structure to which the mask has been attached is immersed into a plugging material (a ceramic slurry) stored in a container, and the cells to be plugged are filled with the plugging material. Also in the other end face of the honeycomb structure, the cells to be plugged are similarly filled with the plugging material. Then, the plugging material with which the opening end portions of the cells are filled are dried to plug the cells.

It is to be noted that the above-mentioned carrying of the oxidation catalyst and the plugging of the opening end portions of the cells do not necessarily have to be performed after manufacturing the honeycomb structure, and may be performed during steps of manufacturing the honeycomb structure described above.

Moreover, unlike the above method, in the manufacturing method of the honeycomb filter of the present invention, for example, the honeycomb structure precursor having the partition wall constituted of the third wall portion may be manufactured first, and the second wall portion and the first wall portion may be successively formed on the one surface (the front surface) of the third wall portion of this honeycomb structure precursor, and the opening end portions of the cells of the resultant honeycomb structure may be plugged.

It is to be noted that in a case where the honeycomb structure precursor having the partition wall constituted of the third wall portion is manufactured in this manner, in a stage in which the first wall portion is formed, the fourth wall portion may simultaneously be formed on the back surface of the third wall portion. As described above, the porous body having the same constitution may be used in the first wall portion and the fourth wall portion. Therefore, the slurry for the first wall portion is flowed into the opening portions of all the cells of the honeycomb structure precursor, whereby the layer formed on the front surface of the second wall portion can form the first wall portion, and the layer formed on the back surface of the third wall portion can form the fourth wall portion.

EXAMPLES

The present invention will hereinafter specifically be described based on examples, but the present invention is not limited to these examples. It is to be noted that "part" and "%" in examples and comparative examples are based on masses, unless otherwise specified. Moreover, measurement methods of various physical values and evaluation methods of various properties will hereinafter be described.

[Average Pore Diameter (μm)]: The average value of lengths of 50 lines extending in a pore space portion along a line parallel to a partition wall was measured in a sectional SEM photograph of a honeycomb filter, to measure an average pore diameter (μm).

[Porosity (%)]: Among lines parallel to a partition wall and having a length of 3 nm or more in a sectional SEM photograph of a honeycomb filter, the ratio of the total of the lengths of lines extending in a pore space portion with respect to the total of the lengths of all the lines was measured to measure a porosity (%).

[PM accumulation time (h)]: An exhaust gas containing a particulate matter (PM) was flowed through a honeycomb filter to measure a time (h) required for 3 g/L of PM to accumulate. It is to be noted that the exhaust gas flowed through the honeycomb filter contained 0.5 g/h of PM at 300° C.

[PM accumulation pressure loss (kPa)]: A PM accumulation pressure loss (kPa) was measured with a gas differential pressure gauge.

[PM trapping efficiency (%)]: A honeycomb filter was installed in an exhaust gas channel, and the exhaust gas was sampled from the upstream and downstream sides of this honeycomb filter, respectively, by a pipe via a valve for a predetermined time. The sampled exhaust gas was allowed to pass through filter paper, and the increase in the mass of the filter paper was measured. Afterward, the concentrations of the PM in the exhaust gas on the upstream and downstream sides were measured, and the ratio between the obtained PM concentrations was calculated to measure a PM trapping efficiency (%).

[Detected CO amount (ppm)]: The concentration (ppm) of CO in the gas which had passed through a honeycomb filter was measured using an exhaust-gas analyzer, and a measured value was obtained as the detected Co amount.

[General evaluation]: In a case where the PM accumulation pressure loss was below 7.0 kPa, the PM trapping efficiency was 80% or more, and the PM accumulation time was 10 h or more, it was judged that the corresponding filter was up to standard and marked "o" and the rest of the filter was rejected and marked "x".

Example 1

Figure 13:
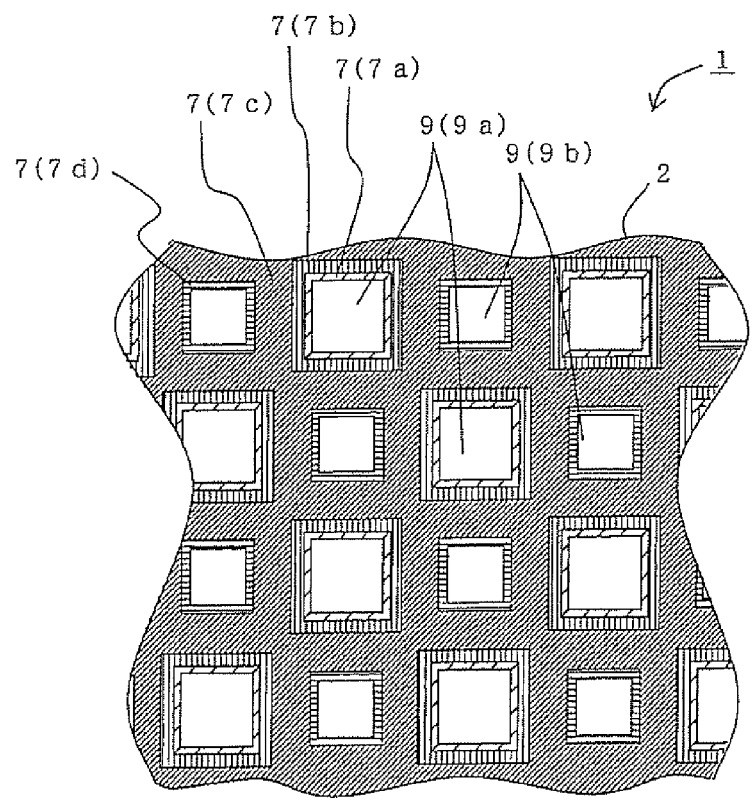
FIG. 13 is an enlarged sectional view showing a section of a honeycomb filter of Example 1 cut along a face vertical to a cell communicating direction.
Figure 14:
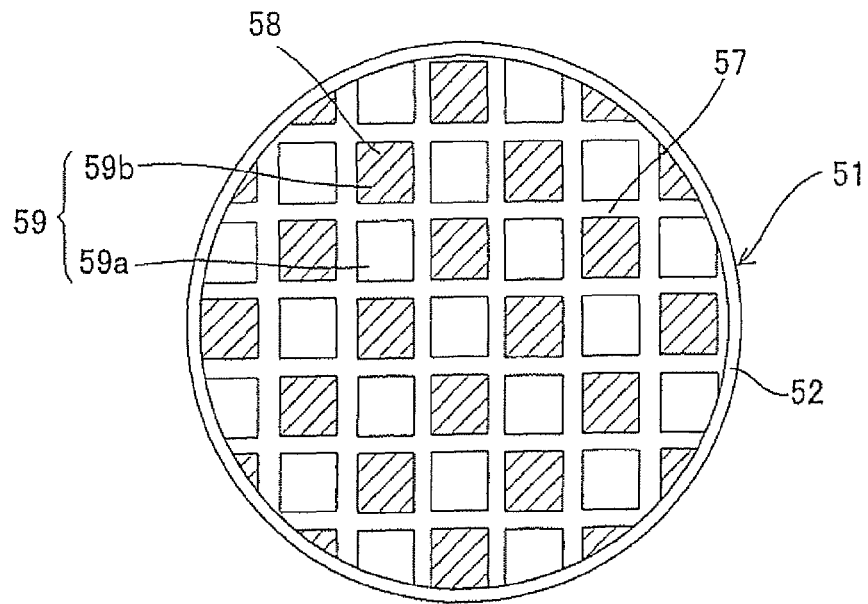
FIG. 14 is a schematic plan view of a conventional honeycomb filter viewed from one end face side.
Figure 15:
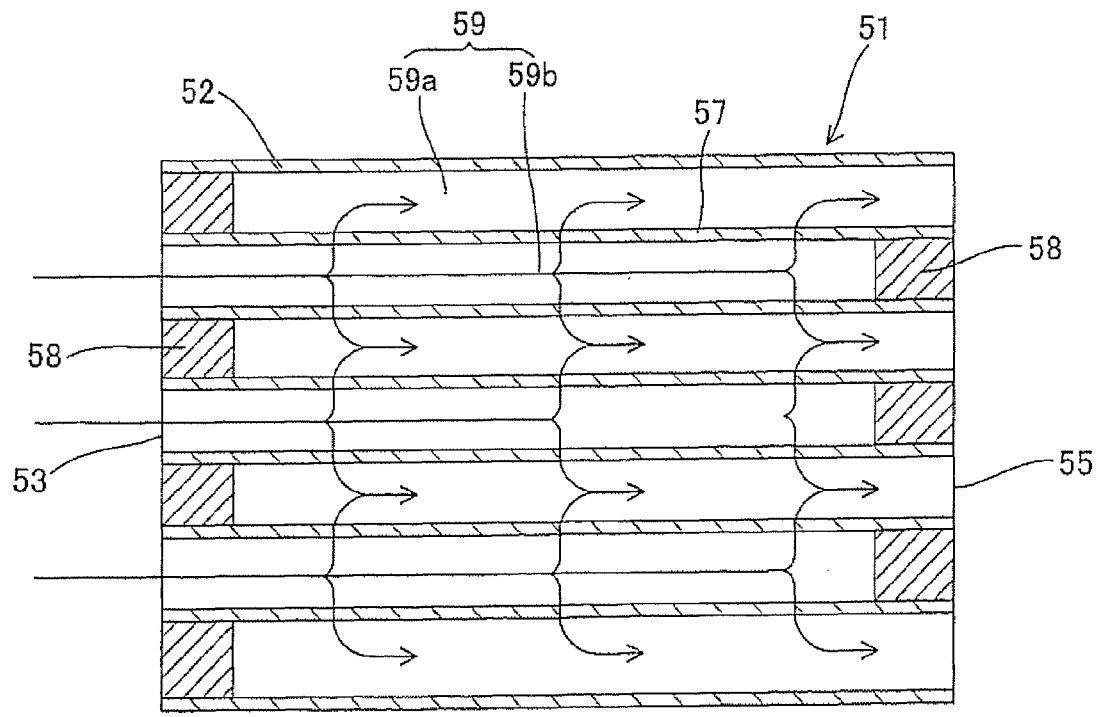
FIG. 15 is a schematic sectional view of the honeycomb filter shown in FIG. 14.

As a honeycomb filter according to Example 1, as shown in FIG. 13, a honeycomb filter 1 was manufactured in which a portion to be the skeleton of a honeycomb structure 2 was constituted of a third wall portion 7c. A second wall portion 7b and a first wall portion 7a were laminated on the front surface of this third wall portion 7c in the thickness direction of a partition wall 7. Furthermore, a fourth wall portion 7d was arranged on the back surface of the third wall portion 7c.

First, a forming clay for forming a honeycomb structure precursor made of the third wall portion was prepared. The forming clay was prepared by adding 35 parts by mass of water as a dispersion medium and 5 parts by mass of pore former to 100 parts by mass of cordierite forming material, further adding 6 parts by mass of organic binder and 0.5 part by mass of dispersant, and kneading these materials by use of a kneader. As the cordierite forming material, there was used a heretofore known cordierite forming material having a mixture ratio which satisfied a chemical composition ratio in a range of 42 to 56 mass % of silica, 30 to 45 mass % of alumna and 12 to 16 mass % of magnesia.

Subsequently, this resultant forming clay was extruded using a die having a desired cell shape, a desired partition wall thickness, and a desired cell density, to manufacture a honeycomb formed body.

Subsequently, the resultant honeycomb formed body was dried, and the resultant dried honeycomb body was calcined at 800° C. for 10 hours to obtain a calcined body. The resultant calcined body was fired at 1430° C. for 10 hours to manufacture a honeycomb structure precursor made of the third wall portion.

Subsequently, the opening portions of cells in the end face of the honeycomb structure precursor were applied with a mask in a checkered pattern by being alternately closed. A slurry for forming the second wall portion, and a slurry for forming the first wall portion and the fourth wall portion were successively supplied to form the second wall portion, the first wall portion, and the fourth wall portion.

Specifically, first the slurry for forming the second wall portion was prepared, and the prepared slurry for the second wall portion was supplied into the opening portions of the cells of the honeycomb structure precursor which were not masked. Afterward, an excessive slurry was blown off with air to form a layer made of the slurry for the second wall portion. Subsequently, the slurry for the second wall portion was dried at 90 to 130° C. for about 1 to 3 hours to form the second wall portion.

The slurry for the second wall portion was prepared by adding 35 parts by mass of water as a dispersion medium and 10 parts by mass of pore former to 100 parts by mass of cordierite forming material, and further adding 10 parts by mass of organic binder and 0.5 part by mass of dispersant.

Subsequently, the slurry for the first wall portion was prepared for forming the first wall portion and the fourth wall portion, and the slurry for the first wall portion was flowed into the opening portions of all the cells of the honeycomb structure precursor to form the first wall portion on the front surface of the second wall portion. The fourth wall portion was simultaneously formed on the back surface of the third wall portion.

The slurry for the first wall portion was prepared by adding 200 parts by mass of water as a dispersion medium and 10 parts by mass of pore former to 100 parts by mass of cordierite forming material, and further adding 5 parts by mass of organic binder and 0.5 part by mass of dispersant.

A honeycomb structure was manufactured in this manner in which four wall portions of the first wall portion, the second wall portion, the third wall portion, and the fourth wall portion were laminated in the thickness direction of the partition wall. A structure such as the honeycomb structure shown in FIG. 13 will hereinafter be referred to as a structure A.

Subsequently, an oxidation catalyst was carried in the pores of the first and fourth wall portions, and the opening end portions of predetermined cells in the resultant honeycomb structure on a side where a fluid flowed out (the outflow side) and the opening end portions of remaining cells on a side where the fluid flowed in (the inflow side) were plugged to manufacture a honeycomb filter (Example 1). Table 1 shows the average pore diameters and porosities of the first, second, and third wall portions. Table 2 shows the hydraulic diameter of the cell, a PM accumulation time, a PM accumulation pressure loss, a PM trapping efficiency, a detected Co amount, and the evaluation result of general evaluation.

TABLE 1

| | | First wall portion | | | Second wall portion | | Third wall portion | | Fourth wall portion | | |
|---|---|---|---|---|---|---|---|---|---|---|---|
| | Structure | Average pore diameter (μm) | Porosity (%) | Carried catalyst | Average pore diameter (μm) | Porosity (%) | Average pore diameter (μm) | Porosity (%) | Average pore diameter (μm) | Porosity (%) | Carried catalyst |
| Example 1 | A | 40 | 55 | Present | 25 | 70 | 13 | 55 | 40 | 55 | Present |
| Example 2 | A | 22 | 55 | Present | 40 | 70 | 13 | 55 | 40 | 40 | Present |
| Example 3 | A | 40 | 55 | Present | 25 | 70 | 13 | 55 | 22 | 55 | Present |
| Example 4 | A | 40 | 55 | Present | 25 | 60 | 13 | 55 | 40 | 55 | Present |
| Example 5 | A | 40 | 55 | Present | 25 | 70 | 13 | 55 | 15 | 55 | Present |
| Example 6 | A | 40 | 55 | Present | 25 | 70 | 13 | 55 | 40 | 55 | Present |
| Example 7 | A | 40 | 55 | Present | 25 | 70 | 13 | 55 | 40 | 55 | None |
| Example 8 | B | 40 | 55 | Present | 25 | 70 | 13 | 55 | — | — | — |
| Example 9 | C | 40 | 55 | Present | 25 | 70 | 13 | 55 | — | — | — |
| Example 10 | D | 40 | 55 | Present | 25 | 70 | 13 | 55 | — | — | — |
| Example 11 | E | 40 | 55 | Present | 25 | 70 | 13 | 55 | — | — | — |
| Example 12 | F | 40 | 55 | Present | — | — | 13 | 55 | 40 | 55 | Present |
| Example 13 | G | 40 | 55 | Present | — | — | 13 | 55 | 40 | 55 | Present |
| Example 14 | H | 40 | 55 | Present | 25 | 70 | 13 | 55 | 40 | 55 | Present |
| Example 15 | I | 40 | 55 | Present | 25 | 70 | 13 | 55 | 40 | 55 | Present |
| Comparative Example 1 | A | 15 | 55 | Present | 25 | 70 | 13 | 55 | 40 | 55 | Present |
| Comparative Example 2 | A | 40 | 55 | Present | 25 | 70 | 19 | 55 | 40 | 55 | Present |
| Comparative Example 3 | A | 40 | 55 | Present | 25 | 70 | 13 | 45 | 40 | 55 | Present |
| Comparative Example 4 | A | 40 | 55 | Present | 25 | 53 | 13 | 55 | 40 | 55 | Present |
| Comparative Example 5 | A | 40 | 55 | None | 25 | 70 | 13 | 55 | 40 | 55 | Present |

TABLE 2

| | | Hydraulic diameter of cell (mm) Cell opening portion | | PM accumulation time | PM accumulation pressure loss | PM trapping efficiency | Detected CO amount | Overall |
|---|---|---|---|---|---|---|---|---|
| | Structure | Outflow side | Inflow side | (h) | (kPa) | (%) | (ppm) | evaluation |
| Example 1 | A | 1.2 | 1.3 | 50 | 5.5 | 85 | 100 | ○ |
| Example 2 | A | 1.2 | 1.3 | 45 | 5.2 | 85 | 120 | ○ |
| Example 3 | A | 1.2 | 1.3 | 46 | 5.5 | 90 | 150 | ○ |
| Example 4 | A | 1.2 | 1.3 | 50 | 5.8 | 82 | 110 | ○ |
| Example 5 | A | 1.2 | 1.3 | 50 | 5.5 | 88 | 600 | ○ |
| Example 6 | A | 1.4 | 1.3 | 50 | 6.5 | 90 | 120 | ○ |
| Example 7 | A | 1.2 | 1.3 | 50 | 5.5 | 87 | 3000 | ○ |
| Example 8 | B | 1.2 | 1.3 | 50 | 5.5 | 85 | 120 | ○ |
| Example 9 | C | 1.2 | 1.3 | 50 | 5.5 | 85 | 150 | ○ |
| Example 10 | D | 1.2 | 1.3 | 50 | 5.5 | 85 | 130 | ○ |
| Example 11 | E | 1.2 | 1.3 | 50 | 5.5 | 87 | 140 | ○ |
| Example 12 | F | 1.2 | 1.3 | 50 | 5.5 | 85 | 120 | ○ |
| Example 13 | G | 1.2 | 1.3 | 50 | 5.5 | 92 | 130 | ○ |
| Example 14 | H | 1.2 | 1.3 | 50 | 5.5 | 90 | 200 | ○ |
| Example 15 | I | 1.2 | 1.3 | 50 | 5.5 | 85 | 250 | ○ |
| Comparative Example 1 | A | 1.2 | 1.3 | 4 | 5.5 | 80 | 200 | X |
| Comparative Example 2 | A | 1.2 | 1.3 | 50 | 5.5 | 55 | 300 | X |
| Comparative Example 3 | A | 1.2 | 1.3 | 50 | 7.3 | 88 | 150 | X |
| Comparative Example 4 | A | 1.2 | 1.3 | 50 | 11.2 | 86 | 200 | X |
| Comparative Example 5 | A | 1.2 | 1.3 | 8 | 5.5 | 85 | 130 | X |

Examples 2 to 7 and Comparative Examples 1 to 5

Honeycomb filters having a honeycomb structure similar to the structure A of the honeycomb structure in the honeycomb filter of Example 1 were manufactured except that average pore diameters and porosities of wall portions were values shown in Table 1, and the hydraulic diameter of each cell had a value shown in Table 2. It is to be noted that in the honeycomb filter of Example 7, no oxidation catalyst was carried in the pores of a fourth wall portion and that in the honeycomb filter of Comparative Example 5, no oxidation catalyst was carried in the pores of a first wall portion. Table 2 shows a PM accumulation time, a PM accumulation pressure loss, a PM trapping efficiency, a detected CO amount, and the evaluation result of general evaluation in Examples 2 to 7 and Comparative Examples 1 to 5.

Example 8

As a honeycomb filter of Example 8, a filter having a honeycomb structure in which a portion to be a skeleton of the honeycomb structure was constituted of a third wall portion, and second and first wall portions were laminated on the front surface of this third wall portion in the thickness direction of a partition wall, was manufactured.

First, a forming clay for forming a honeycomb structure precursor made of the third wall portion was prepared. The forming clay was prepared by adding 36 parts by mass of water as a dispersion medium and 5 parts by mass of pore former to 100 parts by mass of cordierite forming material, further adding 5 parts by mass of organic binder and 0.5 part by mass of dispersant, and kneading these materials by use of a kneader. As the cordierite forming material, a material constituted in the same manner as in the cordierite forming material used in Example 1 was used.

Subsequently, the obtained forming clay was extruded using a die having a desired cell shape, a desired partition wall thickness, and a desired cell density, to manufacture a honeycomb formed body.

Subsequently, the obtained honeycomb formed body was dried, and the resultant honeycomb dried body was calcined at 800° C. for 10 hours to obtain a calcined body. The obtained calcined body was fired at 1420° C. for ten hours to manufacture a honeycomb structure precursor made of the third wall portion.

Subsequently, the opening portions of cells in the end face of the honeycomb structure precursor were applied with a mask in a checkered pattern by being alternately closed. A slurry for forming a second wall portion, and a slurry for forming a first wall portion were successively supplied to form the second wall portion and the first wall portion.

Specifically, first the slurry for forming the second wall portion was prepared, and the prepared slurry for the second wall portion was supplied to the opening portions of the cells of the honeycomb structure precursor which were not masked. Afterward, an excessive slurry was blown off with air to form a layer made of the slurry for the second wall portion. Afterward, the slurry for the second wall portion was dried at 90 to 130° C. for about 1 to 3 hours to form the second wall portion.

The slurry for the second wall portion was prepared by adding 20 parts by mass of water as a dispersion medium and 25 parts by mass of pore former to 100 parts by mass of cordierite forming material, and further adding 5 parts by mass of organic binder and 0.5 part by mass of dispersant.

Subsequently, the slurry for forming the first wall portion was prepared, and the first wall portion was formed by a method similar to the above-mentioned method.

The slurry for the first wall portion was prepared by adding 200 parts by mass of water as a dispersion medium and 15 parts by mass of pore former to 100 parts by mass of cordierite forming material, and further adding 5 parts by mass of organic binder and 0.5 part by mass of dispersant.

A honeycomb structure was manufactured in this manner in which three wall portions of the first wall portion, the second wall portion, and the third wall portion were laminated in the thickness direction of the partition wall. A structure of the honeycomb filter according to Example 8 will hereinafter be referred to as a structure B in which a portion to be the skeleton of the honeycomb structure is constituted of the third wall portion.

Subsequently, an oxidation catalyst was carried in the pores of the first and fourth wall portions, and the opening end portions of predetermined cells in the resultant honeycomb structure on a side where a fluid flowed out (the outflow side) and the opening end portions of remaining cells on a side where the fluid flowed in (the inflow side) were plugged to manufacture a honeycomb filter (Example 8). Table 1 shows the average pore diameters and porosities of the first, second, and third wall portions. Table 2 shows the hydraulic diameter of the cell, a PM accumulation time, a PM accumulation pressure loss, a PM trapping efficiency, a detected CO amount, and the evaluation result of general evaluation.

Example 9

A honeycomb filter (Example 9) was manufactured which was constituted in the same manner as in Example 8 except that a slurry containing an aluminosilicate fiber was used as a slurry for a first wall portion, this slurry was atomized with an atomizer and sucked together with air from a masked side to form a layer, and this layer was dried to form the first wall portion. A structure of a honeycomb structure in Example 9 is referred to as a structure C. Table 2 shows the hydraulic diameter of a cell, a PM accumulation time, a PM accumulation pressure loss, a PM trapping efficiency, a detected CO amount, and the evaluation result of general evaluation.

Example 10

As a honeycomb filter of Example 10, as shown in FIG. 4, a honeycomb filter 1 having a honeycomb structure 2 in which a portion to be the skeleton of the honeycomb structure 2 was constituted of a first wall portion 7a and a second wall portion 7b, and a third wall portion 7c were laminated on the back surface of this first wall portion 7a in the thickness direction of a partition wall 7, was manufactured.

First, a forming clay for forming a honeycomb structure precursor constituted of the first wall portion was prepared. The forming clay was prepared by adding 35 parts by mass of water as a dispersion medium and 15 parts by mass of pore former to 100 parts by mass of cordierite forming material, and further adding 5 parts by mass of organic binder and 0.5 part by mass of dispersant, and kneading these materials by use of a kneader. As the cordierite forming material, a material constituted in the same manner as in the cordierite forming material used in Example 1 was used.

Subsequently, this resultant forming clay was extruded using a die having a desired cell shape, a desired partition wall thickness and a desired cell density, to manufacture a honeycomb formed body.

Subsequently, the obtained honeycomb formed body was dried, and the resultant honeycomb dried body was calcined at 800° C. for 8 hours to obtain a calcined body. The obtained calcined body was fired at 1430° C. for 12 hours to manufacture a honeycomb structure precursor made of the first wall portion.

Subsequently, the opening portions of cells in the end face of the honeycomb structure precursor were applied with a mask in a checkered pattern by being alternately closed. A slurry for forming the second wall portion, and a slurry for forming the third wall portion were successively supplied to form the second wall portion and the third wall portion.

Specifically, first the slurry for forming the second wall portion was prepared, and the prepared slurry for the second wall portion was supplied to the opening portions of the cells of the honeycomb structure precursor which were not masked. Afterward, an excessive slurry was blown off with air to form a layer made of the slurry for the second wall portion. Afterward, the slurry for the second wall portion was dried at 90 to 130° C. for about 1 to 3 hours to form the second wall portion.

The slurry for the second wall portion was prepared by adding 200 parts by mass of water as a dispersion medium and 20 parts by mass of pore former to 100 parts by mass of cordierite forming material, and further adding 8 parts by mass of organic binder and 0.5 part by mass of dispersant.

Subsequently, the slurry for forming the third wall portion was prepared, and the third wall portion was formed by a method similar to the above-mentioned method.

The slurry for the third wall portion was prepared by adding 200 parts by mass of water as a dispersion medium and 10 parts by mass of pore former to 100 parts by mass of cordierite forming material, and further adding 5 parts by mass of organic binder and 0.5 part by mass of dispersant.

A honeycomb structure was manufactured in this manner in which three wall portions of the first wall portion, the second wall portion and the third wall portion were laminated in the thickness direction of the partition wall. A structure shown in FIG. 4 will hereinafter be referred to as a structure D in which a portion to be the skeleton of the honeycomb structure 2 is constituted of the first wall portion 7a.

Subsequently, an oxidation catalyst was carried in the pores of the first wall portions, and the opening end portions of predetermined cells in the resultant honeycomb structure on a side where a fluid flowed out (the outflow side) and the opening end portions of remaining cells on a side where the fluid flowed in (the inflow side) were plugged to manufacture a honeycomb filter (Example 10). Table 1 shows the average pore diameters and porosities of the first, second, and third wall portions. Table 2 shows the hydraulic diameter of the cell, a PM accumulation time, a PM accumulation pressure loss, a PM trapping efficiency, a detected CO amount, and the evaluation result of general evaluation.

Example 11

A honeycomb filter (Example 11) was manufactured which was constituted in the same manner as in Example 10 except that a slurry containing an aluminosilicate fiber and silica as a fiber bonding component was used as a slurry for a third wall portion, to form a layer, and this layer was dried to form the third wall portion. A structure of a honeycomb structure in Example 11 is referred to as a structure E. Table 2 shows the hydraulic diameter of a cell, a PM accumulation time, a PM accumulation pressure loss, a PM trapping efficiency, a detected CO amount, and the evaluation result of general evaluation.

Example 12

As a honeycomb filter of Example 12, as shown in FIG. 6, a honeycomb filter 1 having a honeycomb structure 2 in which a second wall portion 7b was constituted of a void formed between a first wall portion 7a and a third wall portion 7c was manufactured. A structure of the honeycomb structure in Example 12 is referred to as a structure F.

In Example 12, the first wall portion and the third wall portion were constituted of separate porous materials, and a honeycomb structure precursor having a shape where there is a void corresponding to the thickness of the second wall portion between the first wall portion and the third wall portion was obtained. The only third wall portion of the resultant honeycomb structure precursor was impregnated with a slurry for forming small pores, to obtain the honeycomb structure, and the structure was plugged by a method similar to Example 1 to manufacture the honeycomb filter. As a method for selectively impregnating the only third wall portion with the slurry, a sheet provided with holes can be attached to a portion where the slurry is to be supplied to mask the portion. Table 2 shows the hydraulic diameter of the cell, a PM accumulation time, a PM accumulation pressure loss, a PM trapping efficiency, a detected CO amount, and the evaluation result of general evaluation.

Example 13

As a honeycomb filter of Example 13, as shown in FIG. 9, a honeycomb filter 1 having a honeycomb structure 2 in which a first wall portion 7a and a fourth wall portion 7d were integrally formed, a film-like third wall portion 7c was arranged on the front surface of the fourth wall portion 7d in a gap between the first wall portion 7a and the fourth wall portion 7d, and a second wall portion 7b was constituted of a void between the first wall portion 7a and the third wall portion 7c, was manufactured. A structure of a honeycomb structure in Example 13 is referred to as a structure G.

In the honeycomb filter of Example 13, first the same honeycomb structure as the honeycomb structure having the structure F in Example 12 was manufactured. Subsequently, a sheet was attached to one end face of the honeycomb structure to apply a mask so that an only void portion to be the second wall portion was opened. A sheet was attached to the end face on the opposite side to apply a mask so that the only opening portions of remaining cells 9b (see FIG. 9) were opened.

Afterward, fog droplets of a slurry made of a fibrous porous material, a bonding component, a binder, and water and air were absorbed by the void portion to be the second wall portion 7b (see FIG. 9) from the one end face, and the air was flowed out of the opposite end face only, whereby the third wall portion 7c (see FIG. 9) formed of the slurry fog droplets was formed on the front surface of the fourth wall portion 7d (see FIG. 9) to manufacture the honeycomb filter. Table 2 shows the hydraulic diameter of the cell, a PM accumulation time, a PM accumulation pressure loss, a PM trapping efficiency, a detected CO amount, and the evaluation result of general evaluation.

Example 14

As a honeycomb filter of Example 14, as shown in FIG. 5, a honeycomb filter 1 having a honeycomb structure 2 in which a second wall portion 7b was constituted of a fibrous porous material was manufactured. A structure of a honeycomb structure in Example 14 is referred to as a structure H.

As the honeycomb filter of Example 14, first the same honeycomb structure as the honeycomb structure having the structure F of Example 12 was manufactured, and a void portion to be the second wall portion of the honeycomb structure was filled with the fibrous porous material. Both ends of the structure were plugged, whereby the honeycomb filter was manufactured. Table 2 shows the hydraulic diameter of the cell, a PM accumulation time, a PM accumulation pressure loss, a PM trapping efficiency, a detected CO amount, and the evaluation is result of general evaluation.

Example 15

As a honeycomb filter of Example 15, as shown in FIG. 10, a honeycomb filter 1 having a honeycomb structure 2 in which a first wall portion 7a and a fourth wall portion 7d were integrally formed, and a second wall portion 7b made of a fibrous porous material and a film-like third wall portion 7c were arranged in a gap between the first wall portion 7a and the fourth wall portion 7d, was manufactured. A structure of the honeycomb structure in Example 15 is referred to as structure I.

As the honeycomb filter of Example 15, first the same honeycomb structure as the honeycomb structure having the structure G in Example 13 was manufactured, and a void portion to be the second wall portion of the honeycomb structure was filled with the fibrous porous material. Both ends of the structure were plugged, whereby the honeycomb filter was manufactured. Table 2 shows the hydraulic diameter of the cell, a PM accumulation time, a PM accumulation pressure loss, a PM trapping efficiency, a detected CO amount, and the evaluation result of general evaluation.

(Result)

In the honeycomb filter of the present example, satisfactory results could be obtained in all of the PM accumulation time, the PM accumulation pressure loss, the PM trapping efficiency, and the general evaluation. Moreover, in the filter having the fourth wall portion and carrying the oxidation catalyst in the pores of the fourth wall portion, the detected CO amount was small, and hence an especially satisfactory result could be obtained.

On the other hand, in a honeycomb filter according to Comparative Example 1, a first wall portion had an excessively small average pore diameter, so that a PM accumulation time was remarkably short, and continuous regeneration could not be performed during the use of the filter. In a honeycomb filter according to Comparative Example 2, a third wall portion had an excessively large average pore diameter, so that a PM trapping efficiency was low, and it was difficult to use this example as a filter.

In a honeycomb filter according to Comparative Example 3, a third wall portion had an excessively low porosity. Moreover, in a honeycomb filter according to Comparative Example 4, a second wall portion had an excessively low porosity. Therefore, pressure losses during PM accumulation (the PM accumulation pressure loss) were large, and it was difficult to use these examples as filters. Further in a honeycomb filter according to Comparative Example 5, no oxidation catalyst was carried in the pores of a first wall portion, so that a PM accumulation time was remarkably short, and continuous regeneration during the use of the filter could not be performed.

INDUSTRIAL APPLICABILITY

A honeycomb filter according to the present invention can be used as a filter for removing, from an exhaust gas, a particulate matter contained in the exhaust gas discharged from an internal combustion engine such as an engine for a car, an engine for a construction machine or a stationary engine for an industrial machine, other burning devices or the like.

The invention claimed is:

1. A honeycomb filter comprising:
a honeycomb structure having porous partition walls, and a plurality of cells partitioned by the partition walls to constitute passages of a fluid; and
plugging portions which plug opening end portions of some of the cells of the plurality of cells on an outflow side where the fluid flows out and which plug opening end portions of remaining cells on an inflow side where the fluid flows in,
wherein at least a part of the partition walls includes at least three wall portions of a first wall portion, a second wall portion, and a third wall portion which are laminated in a thickness direction of the partition walls from a surface side where the cells having the opening end portions plugged on the outflow side are defined,
the first wall portion is arranged on the surface side of the partition walls where the cells having the opening end portions plugged on the outflow side are defined, has an average pore diameter of 20 μm or more, and carries an oxidation catalyst on the inner surfaces of formed pores,
the second wall portion is arranged on a back surface of the first wall portion, and has a porosity which is higher than that of the first and third wall portions and which is a value of 60% or more, and
the third wall portion is arranged on a back surface of the second wall portion, and has an average pore diameter of 1 to 15 μm and a porosity of 50 to 90%.

2. The honeycomb structure according to claim 1, wherein a hydraulic diameter of the cells having the opening end portions plugged on the outflow side is equal to or larger than that of the remaining cells.

3. The honeycomb filter according to claim 1, wherein a shape of a section of each of the plurality of cells vertical to an axial direction is one of a triangular shape, a quadrangular shape, and a combination of the quadrangular shape and an octagonal shape, and the plugging portions are arranged so that the cells having the opening end portions plugged on the outflow side and the remaining cells having the opening end portions plugged on the inflow side are alternately arranged.

4. The honeycomb filter according to claim 1, wherein the second wall portion has a porosity of 64% or more.

5. The honeycomb filter according to claim 1, wherein the first wall portion has an average pore diameter of 25 μm or more.

6. The honeycomb filter according to claim 1, wherein a volume ratio of the pores in the first wall portion having a pore diameter of below 10 μm is below 10%.

7. The honeycomb filter according to claim 1, wherein the second wall portion is constituted of a void formed between the first wall portion and the third wall portion.

8. The honeycomb filter according to claim 1, wherein the second wall portion is constituted of a fibrous porous material.

9. The honeycomb filter according to claim 1, wherein at least a part of the partition walls further has a fourth wall portion arranged on a back surface of the third wall portion, and the fourth wall portion has an average pore diameter of 20 μm or more, and carries an oxidation catalyst on inner surfaces of formed pores.

* * * * *